(12) United States Patent
Gentner et al.

(10) Patent No.: US 7,604,249 B2
(45) Date of Patent: Oct. 20, 2009

(54) TRAILER-COUPLING ARRANGEMENT

(75) Inventors: Wolfgang Gentner, Steinheim (DE); Martin Dreher, Moeglingen (DE); Dieter Reisinger, Vaihingen/Enz (DE); Joerg Riehle, Asperg (DE); Bert Wegner, Gingen (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 318 days.

(21) Appl. No.: 11/483,404

(22) Filed: Jul. 6, 2006

(65) Prior Publication Data
US 2007/0007749 A1 Jan. 11, 2007

(30) Foreign Application Priority Data
Jul. 7, 2005 (DE) ........................ 10 2005 032 474

(51) Int. Cl.
*B60D 1/14* (2006.01)
(52) U.S. Cl. .................... 280/491.3; 280/478.1
(58) Field of Classification Search ............. 280/491.3, 280/491.1, 478.1
See application file for complete search history.

(56) References Cited

U.S. PATENT DOCUMENTS

| | | | | |
|---|---|---|---|---|
| 4,923,205 | A * | 5/1990 | Durm | 280/491.3 |
| 5,356,166 | A | 10/1994 | Hahne et al. | |
| 6,409,201 | B1 | 6/2002 | Riehle | |
| 6,786,500 | B2 * | 9/2004 | Kleb et al. | 280/491.1 |
| 6,860,503 | B2 | 3/2005 | Aufderheide et al. | |
| 7,216,886 | B2 * | 5/2007 | Rimmelspacher et al. | 280/491.3 |
| 2004/0113391 | A1 | 6/2004 | Aufderheide et al. | |
| 2005/0167945 | A1 | 8/2005 | Rimmelspacher et al. | |

FOREIGN PATENT DOCUMENTS

| | | |
|---|---|---|
| DE | 296 09 508 | 12/1996 |
| DE | 102 52 722 | 2/2004 |
| DE | 103 20 302 | 12/2004 |
| DE | 103 36 445 | 3/2005 |
| DE | 10 2004 004 503 | 8/2005 |
| EP | 1 040 020 | 9/2002 |
| EP | 1 533 149 | 5/2005 |

* cited by examiner

*Primary Examiner*—Tony H. Winner
(74) *Attorney, Agent, or Firm*—Lipsitz & McAllister, LLC

(57) ABSTRACT

In order to provide, as straightforwardly as possible, a trailer coupling comprising a ball neck which can be moved between an operating position and a rest position and has a pivot-bearing body disposed at a first end and a coupling ball disposed at a second end, also comprising a vehicle-mounted pivot-bearing unit in which the pivot-bearing body is accommodated such that it can be pivoted about a pivot axis between the operating position and the rest position, and further comprising a rotation-blocking device having at least one rotation-blocking body, which can be moved in a guide direction with at least one component in the radial direction in relation to the pivot axis, it being possible for the rotation-blocking body to be engaged with, and disengaged from, a receiving space by movement in the guide direction, and having an actuating body which has a wedge surface running transversely to the guide direction, can be moved in an actuating direction and the movement of which in the actuating direction can move, and force, the at least one rotation-blocking body in the guide direction, it is proposed that the rotation-blocking device comprises at least two rotation-blocking bodies, and that the rotation-blocking bodies can be moved in the respective guide direction by a common actuating body.

42 Claims, 27 Drawing Sheets

TRAILER-COUPLING ARRANGEMENT

This patent application claims the benefit of German Application No. 10 2005 032 474.6, filed Jul. 7, 2005, the teachings and disclosure of which are hereby incorporated in its entirety by reference thereto.

BACKGROUND OF THE INVENTION

The invention relates to a trailer-coupling arrangement comprising a ball neck which can be moved between an operating position and a rest position and has a pivot-bearing body disposed at a first end and a coupling ball disposed at a second end, also comprising a vehicle-mounted pivot-bearing unit in which the pivot-bearing body is accommodated such that it can be pivoted about a pivot axis between the operating position and the rest position, and further comprising a rotation-blocking device having at least one rotation-blocking body, which can be moved in a guide direction with at least one component in the radial direction in relation to the pivot axis, it being possible for the rotation-blocking body to be engaged with, and disengaged from, a receiving space disposed on the pivot-bearing body by movement in the guide direction, and having an actuating body which has a wedge surface running transversely to the guide direction, can be moved in an actuating direction and the movement of which in the actuating direction can move, and force, the at least one rotation-blocking body in the guide direction.

Such a trailer coupling is known from EP 1 040 020.

Taking this prior art as the departure point, it is an object of the invention to provide a trailer coupling with as straightforward a construction as possible.

SUMMARY OF THE INVENTION

In the case of a trailer coupling of the type described in the introduction, this object is achieved according to the invention in that the rotation-blocking device comprises at least two rotation-blocking bodies, and in that the rotation-blocking bodies can be moved in the respective guide direction by a common actuating body.

The advantage of the solution according to the invention may be seen in the fact that it provides a straightforward possibility of achieving a rotation-blocking action which withstands the high loading of the ball neck.

It is even more advantageous if the rotation-blocking device comprises at least three rotation-blocking bodies.

A particularly advantageous solution provides that the rotation-blocking bodies are disposed relative to the actuating body such that at least their reaction forces which are directed transversely to the pivot axis and act on the actuating body compensate one another at least in part.

Such a solution thus has the advantage that the actuating body need not be designed such that it has to be mounted in a stable manner in order to absorb the reaction forces to which it is subjected by the rotation-blocking bodies; rather, it can be mounted very straightforwardly if the reaction forces to which the actuating body is subjected by the rotation-blocking bodies cancel one another at least in part.

It is particularly advantageous here if the rotation-blocking bodies are disposed relative to the actuating body such that at least their reaction forces which are directed transversely to the pivot axis and act on the actuating body substantially cancel one another.

It is particularly advantageous if the rotation-blocking bodies are disposed relative to the actuating body such that their reaction forces which act on the actuating body cancel one another at least in part.

It is possible here, in principle, for the rotation-blocking bodies to be disposed in any desired manner relative to the actuating body.

An exemplary embodiment here provides that the rotation-blocking bodies are disposed around the actuating body. Such a solution makes it possible, on the one hand, to dispose the rotation-blocking bodies in a space-saving manner and, on the other hand, to compensate at least in part the reaction forces which act on the actuating body.

Such a set-up is particularly advantageous when the rotation-blocking bodies are disposed substantially symmetrically in relation to a plane running perpendicularly to the pivot axis.

In order to fix the pivot-bearing body in terms of rotation, as far as possible, in a play-free manner, it is preferably provided that at least two of the rotation-blocking bodies interact with the receiving spaces provided for them such that the pivot-bearing body is thereby subjected to torques acting in opposite directions to one another.

These two torques acting in opposite directions to one another make it possible for the pivot-bearing body to be fixed in a play-free manner by the pivot-bearing unit.

No more specific details have been given up to now in respect of the movements of the actuating body for the purpose of moving the rotation-blocking bodies.

It would thus be conceivable, for example, to displace the actuating body in the direction of the pivot axis and, on account of this displacement of the actuating body, to move the rotation-blocking bodies in the guide direction.

A solution which is advantageous from the point of view of compactness provides that the actuating body is disposed such that it can be rotated about the pivot axis.

It is particularly advantageous here if the actuating body has wedge surfaces which extend over an angular region around the pivot axis, vary in terms of radial spacing from the pivot axis and can act on the rotation-blocking bodies.

Furthermore, no details have been given, in conjunction with the prior description of the solution according to the invention, as to how the rotation-blocking bodies, for their part, are to be guided in the guide direction.

It would be conceivable, for example, to guide the rotation-blocking body by a guiding accommodating region in the pivot-bearing body and to provide stationary receiving spaces with which the at least one rotation-blocking body can be engaged, or from which it can be disengaged.

It is particularly advantageous, however, if the rotation-blocking body is guided by a guide body which follows the pivot-bearing body in the radial direction.

The guide body is preferably formed here such that it has a guide sleeve with the guiding accommodating region for the respective rotation-blocking body.

A guide body which is provided in this way can also advantageously be used, in particular, in that a bearing for the actuating body is connected to the guide body, so that the actuating body can thus be mounted in a straightforward and advantageous manner.

It is likewise the case that no more specific details have been given up to now in respect of the mounting of the pivot-bearing body itself in the pivot-bearing unit.

Thus, in particular, an advantageous solution provides that the guide body forms a pivot bearing for the pivot-bearing body, so that the guide body, in addition to the guiding function, has the further advantage of performing the bearing function for the pivot body.

The guide body is suitably disposed here such that it is part of the vehicle-mounted pivot-bearing unit.

Within the framework of the solution according to the invention, different possible ways of disposing the guide body, pivot-bearing body and actuating body relative to one another are conceivable.

One conceivable solution would thus be one in which the actuating body encloses the guide body and the pivot-bearing body is enclosed by the guide body, that is to say engages in the guide body.

A further advantageous solution, however, provides that the actuating body is enclosed by the guide body, and that the pivot-bearing body engages around the guide body.

In respect of as straightforward a design as possible, as an alternative or as a supplement to the exemplary embodiments which have been described up to now, the object which was mentioned in the introduction is achieved according to the invention, in the case of a trailer coupling of the type described in the introduction, in that the pivot-bearing body forms an outer body which encloses the pivot-bearing unit on the outside and is disposed in relation to the pivot-bearing unit such that it cannot be displaced in the direction of the pivot axis.

Disposing the pivot-bearing body in this way has the advantage, on the one hand, of an advantageous spatial construction for the pivot-bearing unit itself and, on the other hand, of relatively straightforward sealing for the pivot-bearing unit, since the pivot-bearing body does not execute any movements in the axial direction of the pivot axis.

Seals which run around the pivot axis are preferably provided between a housing of the pivot-bearing unit and the two end sides of the outer body and provide sealing against the ingress of dirt and moisture.

In respect of the stability and also of the small amount of space required by the trailer coupling according to the invention, a particularly advantageous exemplary embodiment provides that the first end of the ball neck is attached to the outer body.

This makes it possible to provide a particularly straightforward and stable connection between the pivot-bearing body and the ball neck, likewise without increasing the amount of space required.

No more specific details have been given up to now in respect of the movement of the rotation-blocking bodies by the actuating body. It is thus provided, in the case of an advantageous solution, that the rotation-blocking bodies can be moved from a release position into a blocking position by the actuating body.

The actuating body is preferably formed here such that, in an inactive position, it allows the release position of the rotation-blocking bodies.

In addition, a further embodiment of the actuating body provides that, in an active position, this actuating body retains the rotation-blocking bodies in their blocking position.

In order, then, to ensure that the rotation-blocking bodies always pass into their blocking position, in particular when there is no actuation by the actuating body, it is preferably provided that the actuating body is forced in the direction of its active position by an elastic energy store.

In order for it to be possible for the actuating body to be actuated in a suitable manner, an actuating arrangement by means of which the actuating body can be moved from the active position into the inactive position is preferably provided.

The actuating arrangement is advantageously formed here such that the actuating body can be moved, by this actuating arrangement, counter to the direction in which it is forced by the energy store.

In the case of a rotatable actuating body, it is provided that the actuating arrangement can be used to rotate the actuating body counter to the direction of rotation which is brought about by the energy store.

No more specific details have been given up to now in respect of the formation of the actuating arrangement. An advantageous solution thus provides that the actuating arrangement has a drive element which is coupled to the actuating body.

Such a coupling between the drive element and the actuating body may be formed in a wide variety of different ways. One solution would be a direct connection between the drive element and the actuating body.

It is particularly advantageous, however, if the drive element and the actuating body are coupled to one another via a carry-along coupling device.

Such a carry-along coupling device may be formed in a wide variety of different ways. An advantageous embodiment provides that the carry-along coupling device has a free-travel state, in which there is no carry-along action, and a carry-along state.

One embodiment of a trailer coupling according to the invention provides that the carry-along coupling device is formed such that, starting from a starting position, movement of the drive element brings about movement of the actuating body in an intermediate position, only following passage through a free-travel state and once the carry-along state has been reached.

In order for the actuating arrangement always to be retained in a defined state even without being subjected to any action, it is provided that the actuating arrangement is formed such that it passes automatically into a starting position.

This can be realized particularly advantageously when the drive element of the actuating arrangement is forced in the direction of its starting position by an elastic energy store.

No information has been given, in conjunction with the prior explanation of the individual exemplary embodiments as to how the active position of the actuating body is to be reliably secured.

A particularly advantageous solution thus provides that the actuating body can be blocked by a safety device.

A particularly advantageous solution is one in which the actuating body can be blocked by the safety device against reaching its inactive position, in order to ensure that the actuating body never automatically allows the release position of the rotation-blocking bodies, for example in the event of a failure of the elastic energy store, which forces the actuating body in the direction of its active position.

Such a safety device is formed such that it requires action in order to eliminate the blocking of the actuating body.

For this reason, it is suitably provided that the actuating arrangement is coupled to the safety device, so that release of the blocking of the actuating body by the safety device can also be eliminated via the actuating arrangement.

The safety device is preferably coupled to the actuating arrangement here such that the safety device blocks any movement of the actuating body which is not initiated by actuation.

In particular, the safety device is formed such that, when the actuating arrangement is not actuated, it blocks movement of the actuating body into its inactive position.

A suitable solution here provides that the drive element of the actuating arrangement is coupled to the safety device.

The drive element may suitably be formed here such that the action to which the actuating body is subjected and the action to which the safety device is subjected are coordinated with one another via the drive element, so that actuation of the actuating arrangement, on the one hand, results in the blocking of the actuating body being eliminated and, on the other hand, results in the actuating body being moved from the active position into the inactive position.

It is provided for this purpose, for example, that, as it moves from the starting position into an intermediate position, the drive element transfers the safety device from the securing position into the disengaged position.

A wide variety of different possibilities are conceivable for the coupling between the drive element and the safety device. For example, any type of coupling, for example even via an electric control means, would be conceivable.

A solution which is particularly expedient on account of its simplicity here provides that the drive element and the safety device are coupled to one another via a mechanical coupling device.

The mechanical coupling device is advantageously formed such that it uses a guide track to control the action to which the safety device is subjected.

Further features and advantages of the invention form the subject matter of the following description and of the illustration of a number of exemplary embodiments.

DETAILED DESCRIPTION OF THE INVENTION

Figure 1:
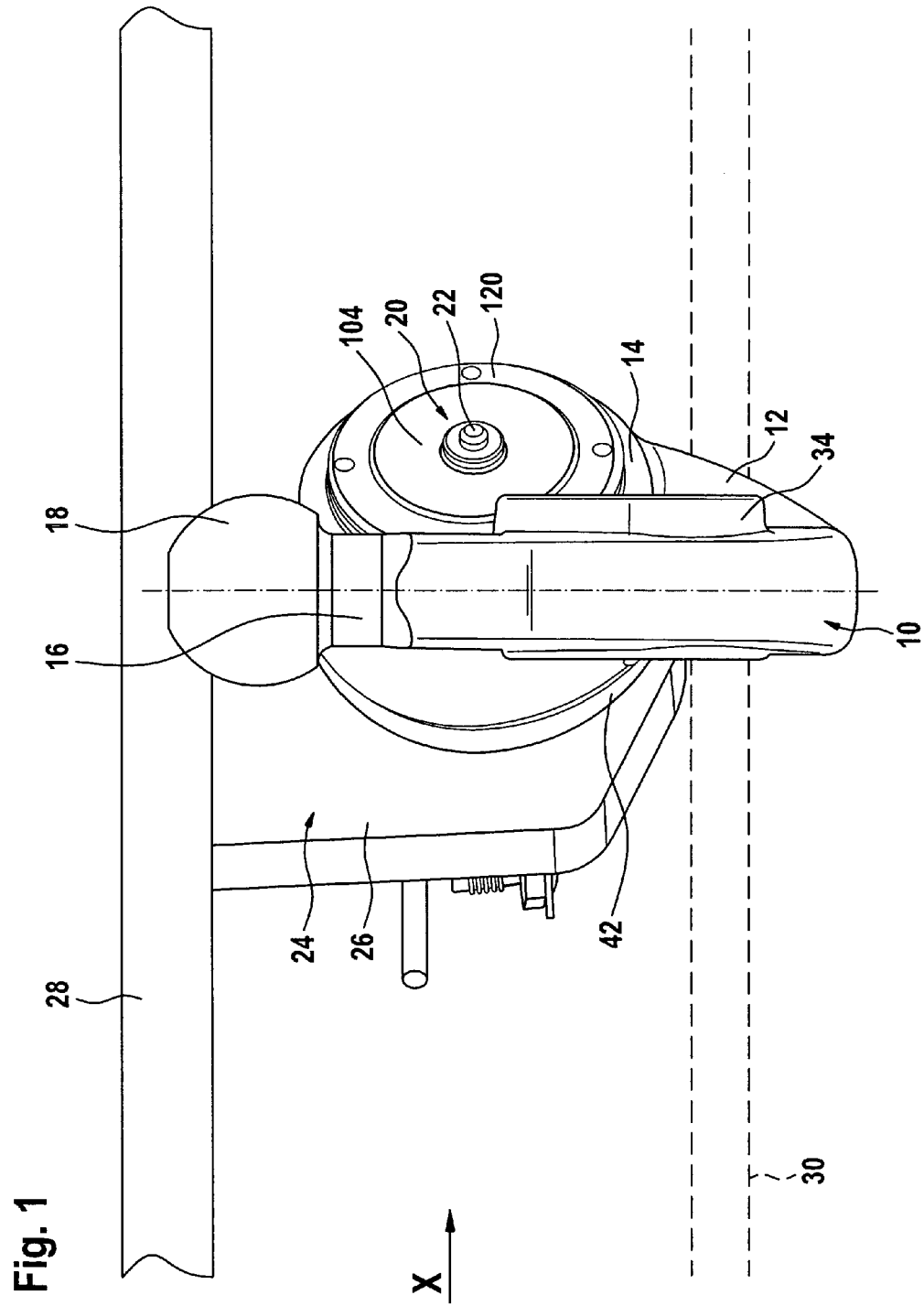
FIG. 1 shows a plan view of a first exemplary embodiment of a trailer coupling according to the invention with a view in the direction of travel of the trailer coupling mounted on a vehicle tail, the trailer coupling being located in its operating position.
Figure 2:
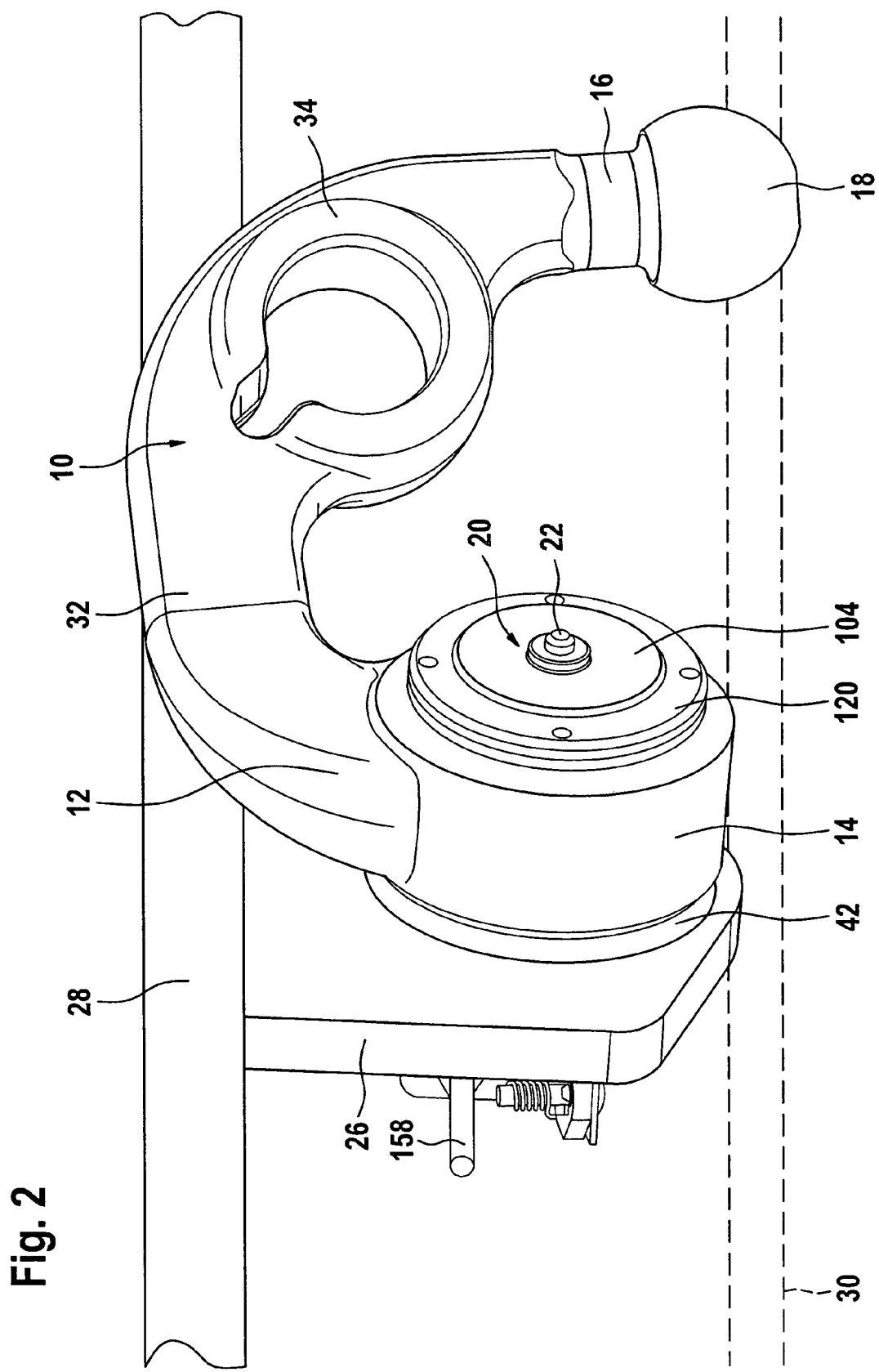
FIG. 2 shows a view corresponding to FIG. 1 with the trailer coupling located in the rest position.

A first exemplary embodiment of a trailer coupling according to the invention, illustrated in FIG. 1 in an operating position A and in FIG. 2 in a rest position R, comprises a ball neck which is designated as a whole by 10, is mounted on a pivot-bearing body 14 by way of a first end 12 and, at a second end 16, carries a coupling ball which is designated as a whole by 18 and on which a coupling-ball receiver of a trailer can be fixed.

Figure 3:
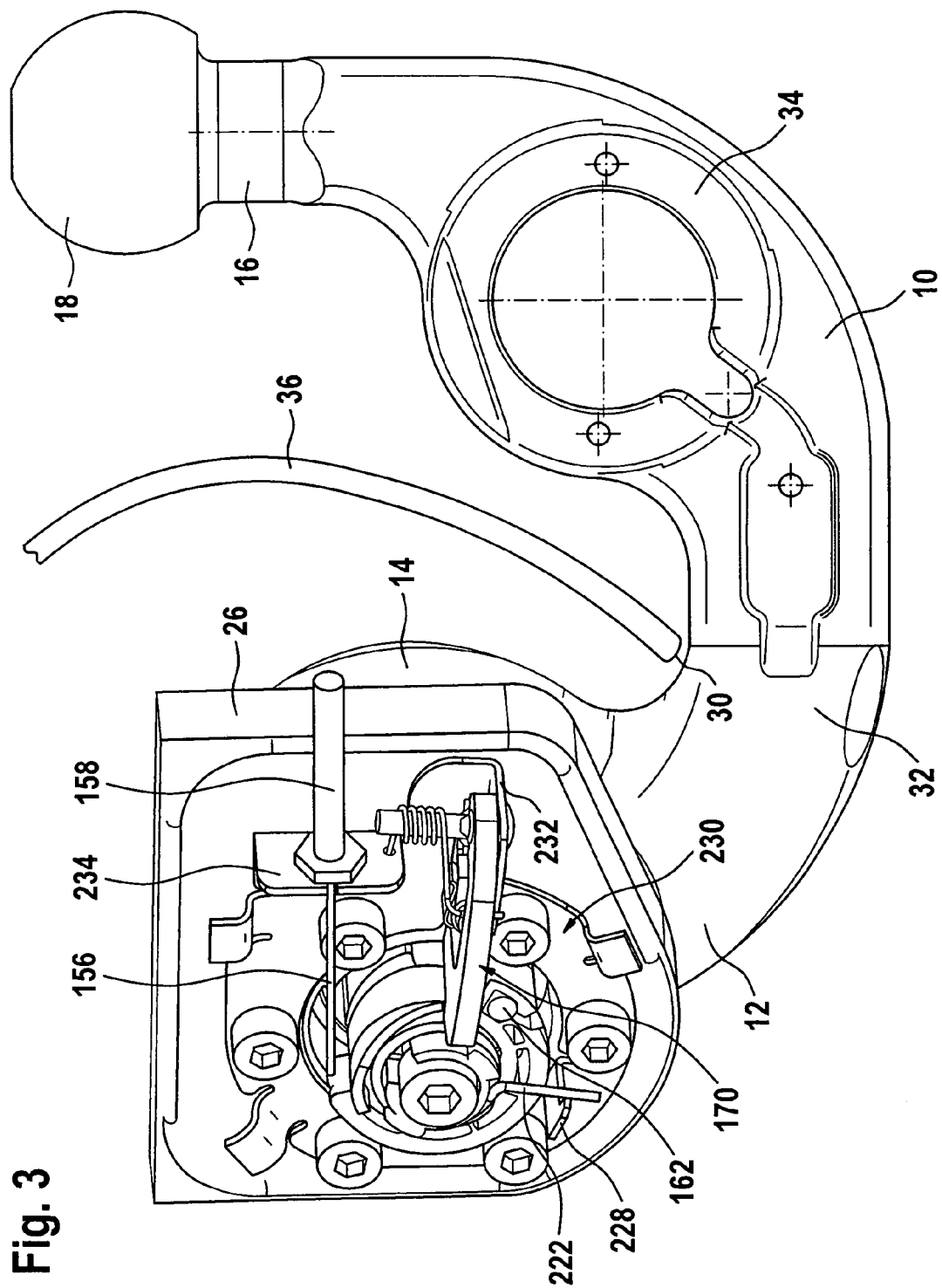
FIG. 3 shows a view in the direction of arrow X in FIG. 1.

The pivot-bearing body 14 is mounted such that it can be pivoted about a pivot axis 22 relative to a vehicle-mounted carrier 24 by a pivot-bearing unit which is designated as a whole by 20, the carrier 24 preferably having a carrying plate 26 which holds the pivot-bearing unit 20, preferably extends in a plane perpendicular to the pivot axis 22 and has a vehicle-mounted transverse carrier 28, which can be secured in a known manner at the tail of a vehicle body, to be precise such that the pivot-bearing unit 20 and the carrier 24 are located on that side of a lower edge 30 of a bumper unit 36 which is directed away from a carriageway surface and are covered by the bumper unit 36 (FIG. 3).

In the operating position, which is illustrated in FIG. 1, the ball neck 10 engages, by way of a portion 32 which follows the first end 12, beneath the lower edge 30 of the bumper unit 36, so that the second end 16 and the coupling ball 18 together with a plug receptacle 34 are located on a side of the rear bumper unit 36 which is directed away from the vehicle body, whereas in the rest position, both the pivot-bearing unit 20 and the ball neck 10 as a whole together with the coupling ball 18 are covered from view from the rear by the rear bumper unit 36.

Figure 4:
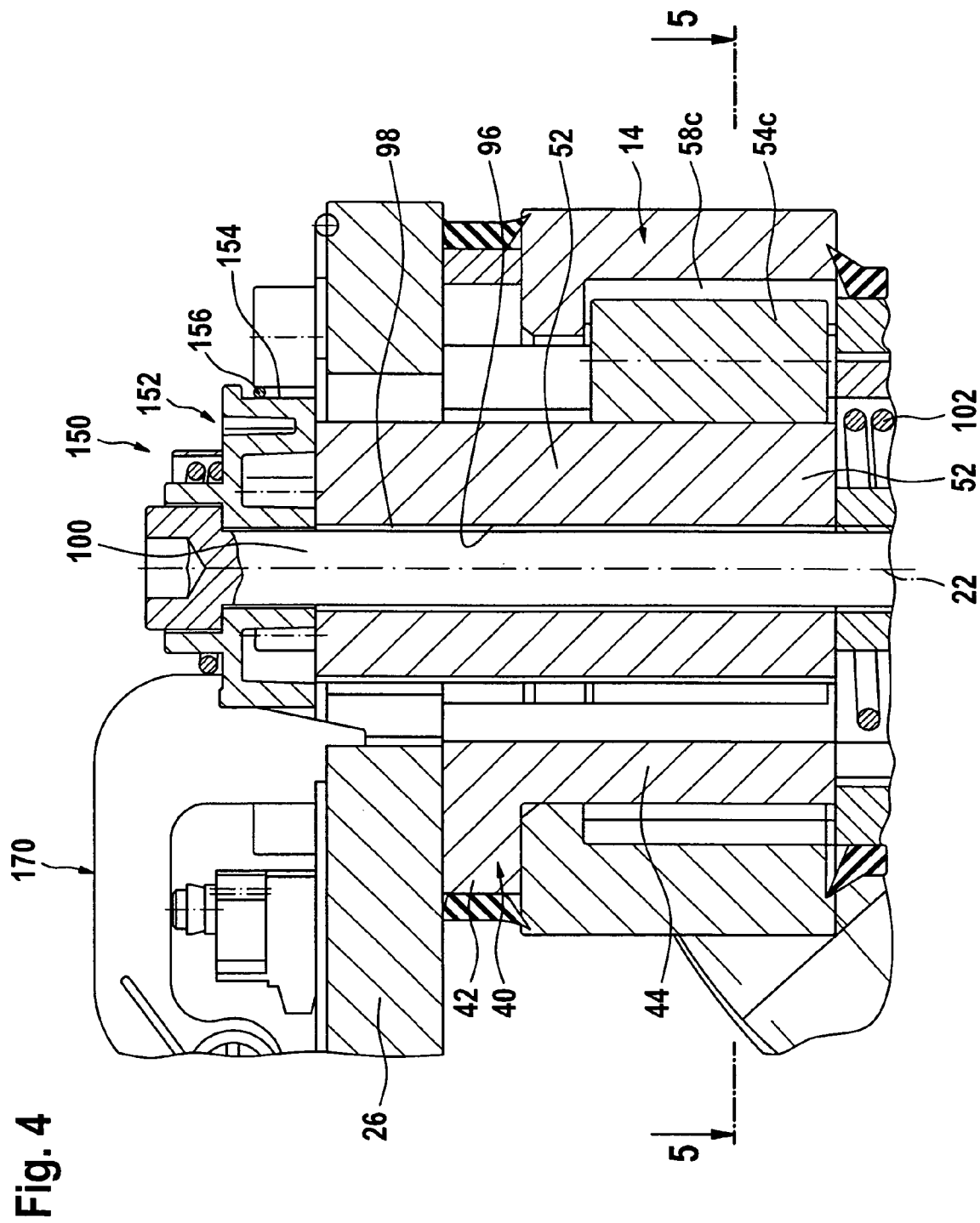
FIG. 4 shows a partial section along a section plane running through the pivot axis and one of the rotation-blocking bodies, with the rotation-blocking elements in a blocking position and an actuating body in an active position.
Figure 5:
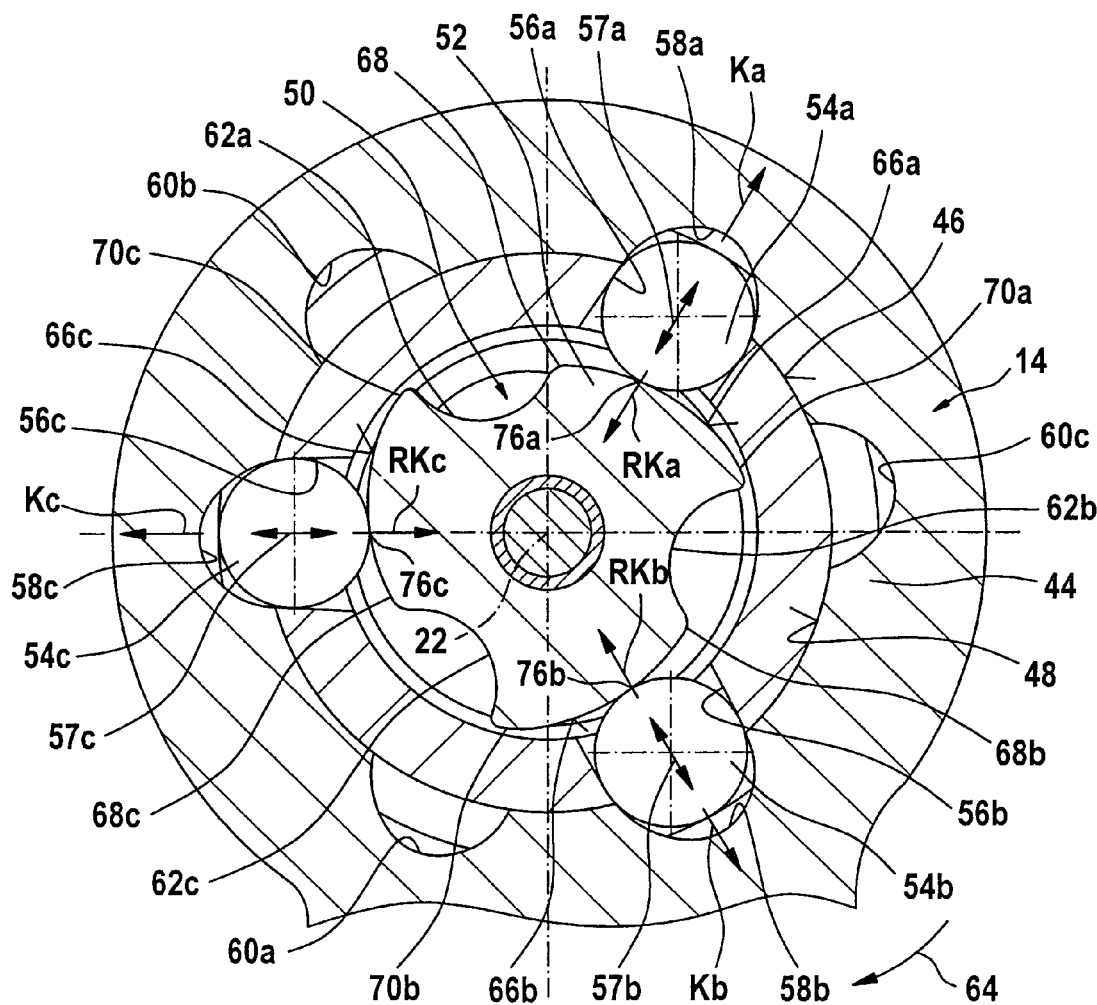
FIG. 5 shows a section along line 5-5 in FIG. 4.

As is illustrated in FIGS. 4 and 5, the pivot-bearing unit 20 comprises a guide body 40, which is fixedly connected to the carrying plate 26 by way of a flange 42, and a guide sleeve 44, which, starting from the flange 42, extends away from the carrying plate 26 and on which the pivot-bearing body 14 is mounted in a rotatable manner. For this purpose, the guide sleeve 44 comprises a cylindrical outer lateral surface 46, on which the pivot-bearing body 14 is located by way of a cylindrical inner surface 48 and thus undergoes rotary guidance about the pivot axis 22, so that the pivot-bearing body 14 can be rotated relative to the guide body such that the ball neck 10 can be pivoted from the operating position A into the rest position R and vice versa.

By virtue of its fixed connection to the carrier plate 26 and the carrier 24, the guide body 40 thus forms the vehicle-mounted rotary mounting for the pivot-bearing body 14.

In order to fix the pivot-bearing body 14 in the operating position A and the rest position R, the pivot-bearing unit 20 is provided with a rotation-blocking device which is designated as a whole by 50 and has an actuating body 52 and a plurality of rotation-blocking bodies 54, which can be activated by the actuating body 52 and are guided in guiding accommodating regions 56 of the guide sleeve 44 such that they can be moved in a guide direction 57 running substantially radially in relation to the pivot axis 22, and also has first receiving spaces 58 and second receiving spaces 60 which extend into the pivot-bearing body 14, starting from the inner surface 48 of the latter, and with which the rotation-blocking bodies can be brought into engagement in the operating position A and in the rest position R, respectively, the receiving spaces 58, 60 having wall surfaces 59, 61 which are increasingly less spaced apart from one another in the radial direction in relation to the pivot axis 22.

If, for example, the rotation-blocking device 50, as is illustrated for the first exemplary embodiment in conjunction with FIGS. 4 and 5, comprises a set of three rotation-blocking bodies 54a, 54b and 54c, then the guide sleeve 44 has a set of three guiding accommodating regions 56a, 56b and 56c, in which the rotation-blocking bodies 54a, 54b and 54c are guided such that they can be displaced in the guide direction 57, which runs substantially radially in relation to the pivot axis 22, and the pivot-bearing body 14 is provided with a set of first receiving spaces 58a, 58b and 58c, with which the rotation-blocking bodies 54a, 54b and 54c can be brought into engagement in the operating position A, and with a set of second receiving spaces 60a, 60b and 60c with which the rotation-blocking bodies 54a, 54b and 54c can be brought into engagement in the rest position R.

In order for the rotation-blocking bodies 54 to be suitably moved and positioned in the guide direction 57, the actuating body 52 is provided with a set of, in total, three retraction receiving spaces 62a, 62b and 62c and three pressure-exerting surfaces 66a, 66b and 66c, which follow the retraction receiving spaces 62a, 62b, 62c in a rotational direction 64, it being possible for the rotation-blocking bodies 54, in their release position, to penetrate into the retraction receiving spaces 62a, 62b, 62c to the extent where they no longer project beyond the outer lateral surface 46 of the guide sleeve 44, and the pressure-exerting surfaces 66a, 66b, 66c extending radially outward in relation to the pivot axis 22 to an increasing extent, as they progress in the rotational direction 64, in each case from a radially inner initial region 68a, 68b and 68c, which immediately follows the respective retraction receiving spaces 62, up to a respective radially outer end region 70a, 70b and 70c and thus, during a rotary movement of the actuating body 52, acting as wedge surfaces on the rotation-blocking bodies 54 in order to move the latter into their blocking position.

The pressure-exerting surfaces 66 here preferably run as helical or involute segments relative to the pivot axis 22.

Figure 6:
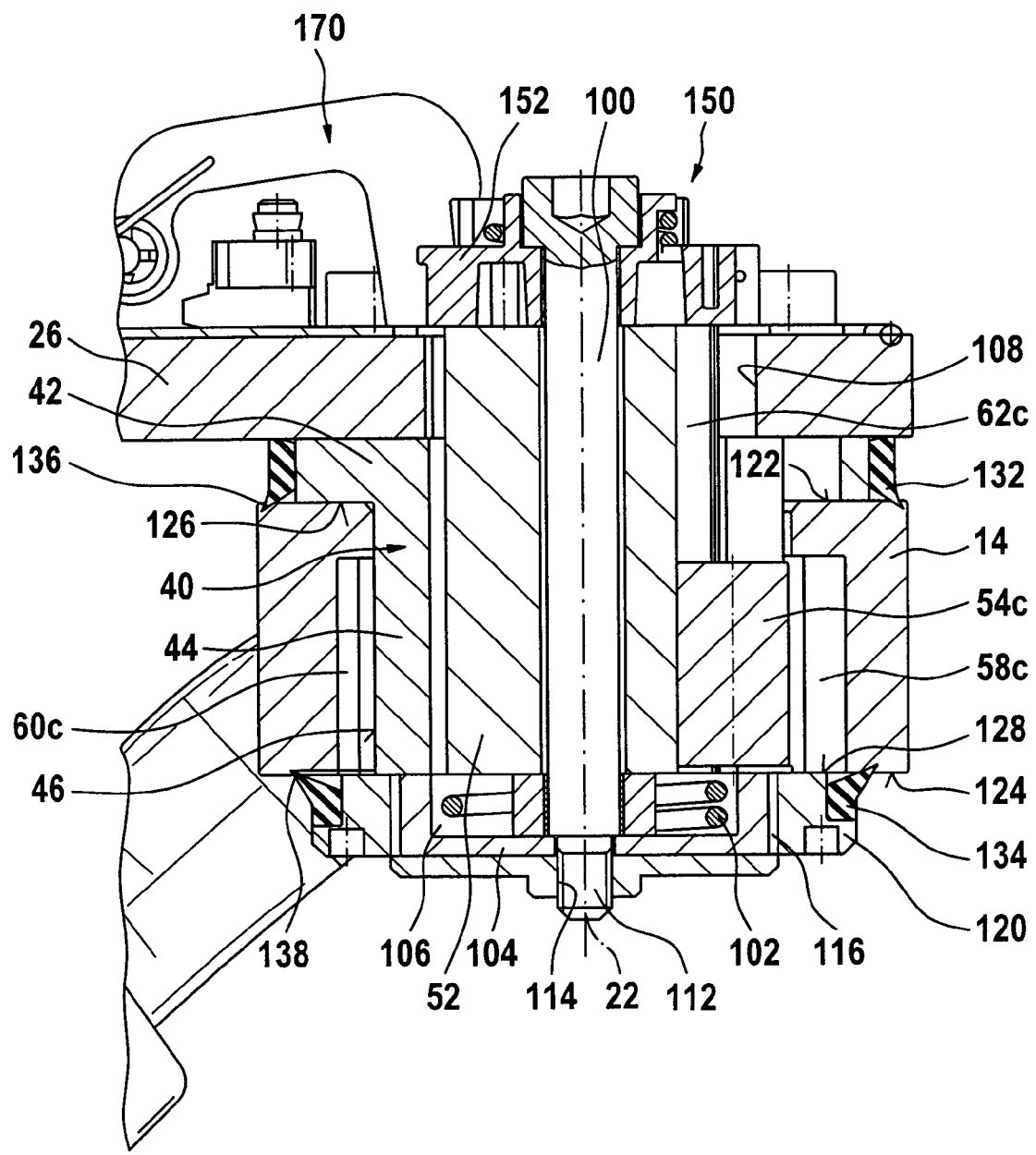
FIG. 6 shows an illustration similar to FIG. 4 with the rotation-blocking body located in the release position and the actuating body located in the inactive position.
Figure 7:
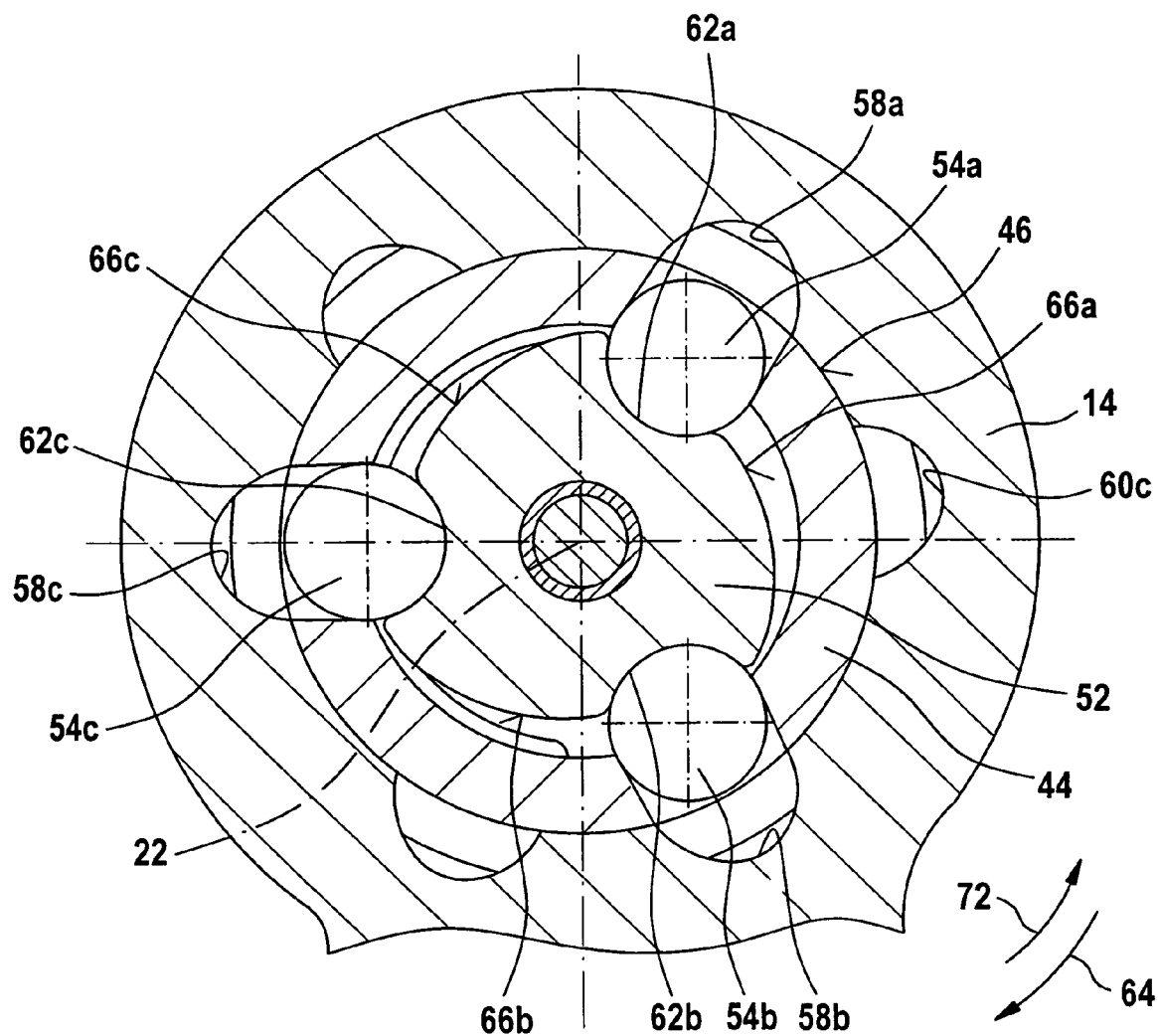
FIG. 7 shows a section corresponding to FIG. 5 with the rotation-blocking bodies and the actuating body positioned as in FIG. 6.

In order either to retain the rotation-blocking bodies 54 in their blocking position, by subjecting them to the action of the pressure-exerting surfaces 66 between the initial region 68 and the end region 70, or to allow them to penetrate into the retraction receiving space 62 in the release position, the actuating body 52 can likewise be rotated about the pivot axis 22, in particular coaxially in relation to the latter, to be precise such that the set of retraction receiving spaces 62a, 62b and 62c is directed toward the rotation-blocking bodies 54 and makes it possible for the latter, as is illustrated in FIGS. 6 and 7, in the inactive position, to penetrate into the retraction receiving spaces 62 in the radial direction in relation to the pivot axis 22, in order to allow the respective rotation-blocking bodies 54 to release the first receiving spaces 58 or the second receiving spaces 60 in respect of rotation together with the pivot-bearing body 14 about the pivot axis 22, so that the pivot-bearing body 14, with the ball neck 10, can be rotated freely, without obstruction, relative to the guide sleeve 44, as is illustrated in FIGS. 6 and 7, the rotation-blocking bodies 54 in this case not extending beyond the outer lateral surface 46 of the guide sleeve 44.

Figure 8:
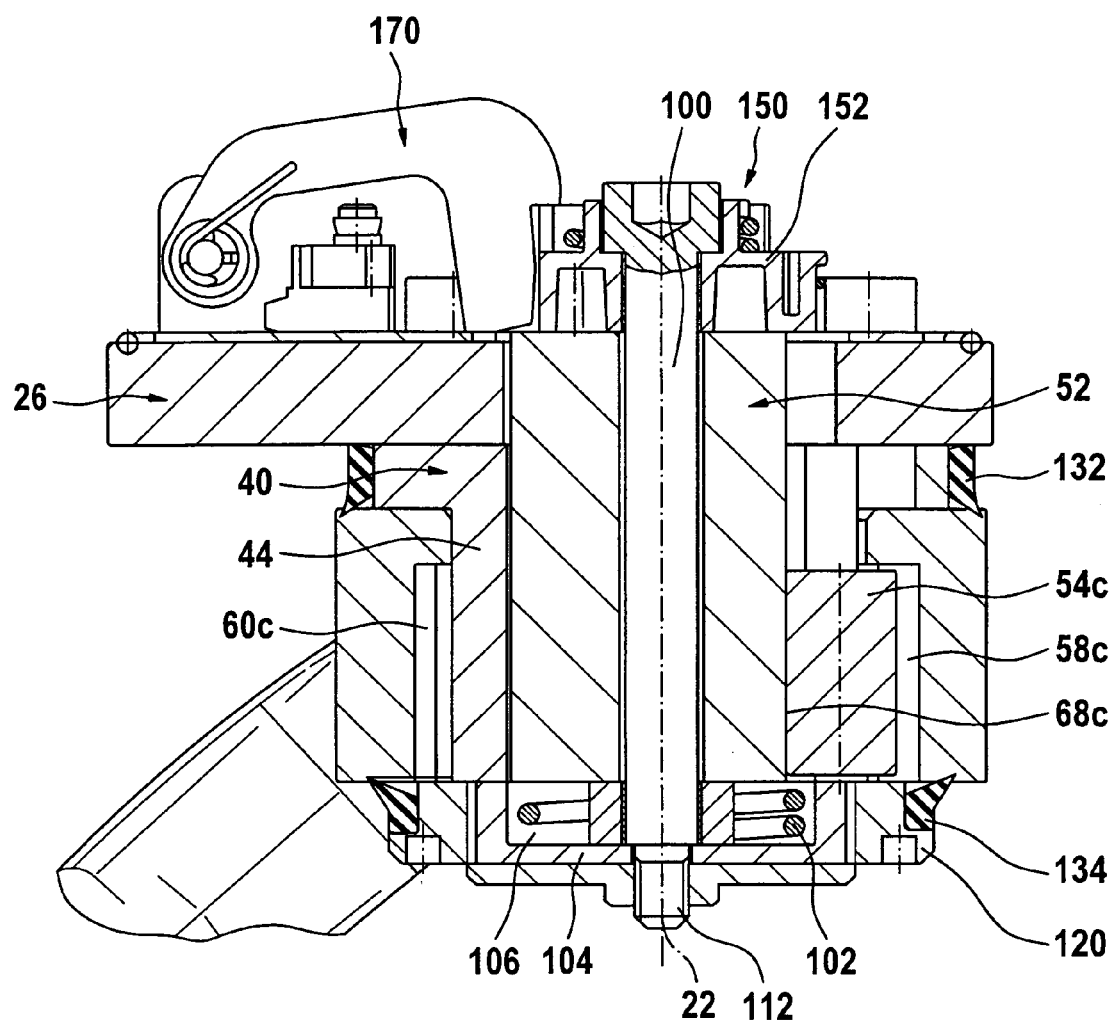
FIG. 8 shows a section corresponding to FIG. 4 with the rotation-blocking element located in a blocking position, but without the pivot-bearing body being fixed in a play-free manner.
Figure 9:
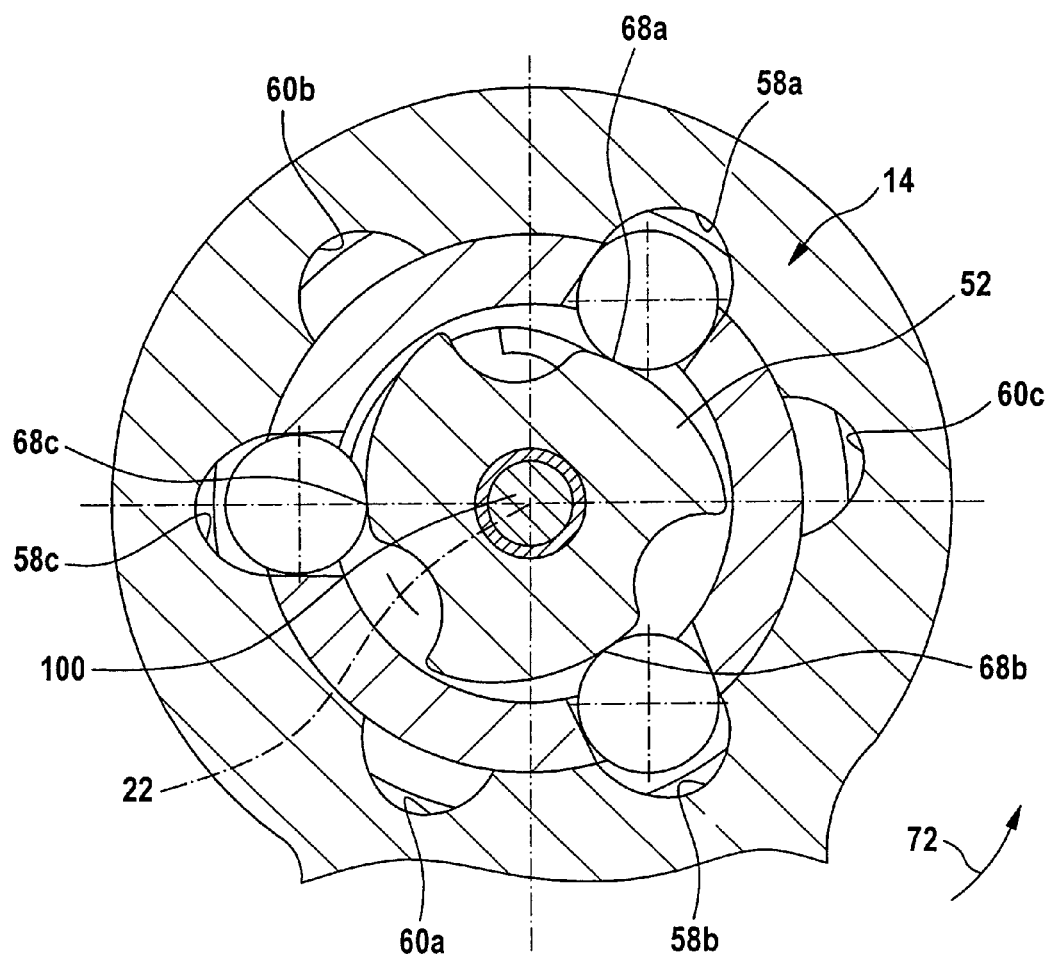
FIG. 9 shows a section corresponding to FIG. 5 with the rotation-blocking bodies positioned as is illustrated in FIG. 8.

In the case of rotation-blocking bodies 54 being seated in the retraction receiving spaces 62, rotation of the actuating body 52 in a direction of rotation 72 counter to the rotational direction 64 causes the rotation-blocking bodies 54 to be moved out of the retraction receiving spaces 62 and in the first instance, as is illustrated in FIGS. 8 and 9, in the active position of the actuating body 52, to be seated on the initial regions 68 of the pressure-exerting surfaces 66, albeit penetrating, for example, into the first receiving spaces 58 and thus preventing the pivot-bearing body 14 from being able to rotate freely.

If the actuating body 52 is rotated further in the direction of rotation 72, counter to the rotational direction 64, then the rotation-blocking bodies 54 are subjected to the action of regions of the pressure-exerting surfaces 66 which are located further and further outward in the radial direction in relation to the pivot axis 22, these regions thus pushing the rotation-blocking bodies 54 to an increasing extent, for example in the operating position A of the ball neck 10, into the first receiving spaces 58a, 58b and 58c, in order thus for the pivot-bearing body 14 to be fixed in a substantially play-free manner relative to the guide body 40, in this case to the guide sleeve 44. In this blocking position of the rotation-blocking bodies 54, the actuating body 52 is located in its active position such that the rotation-blocking bodies 54, as is illustrated in FIGS. 4 and 5, are seated approximately on central regions 76, located between the initial regions 68 and the end regions 70, of the pressure-exerting surfaces 66 and are acted on by the same.

The play-free locking of the pivot-bearing body 14 by the rotation-blocking bodies 54 can be achieved particularly advantageously when the rotation-blocking bodies 54 and the receiving spaces 58 and 60 are configured such that, as one of the rotation-blocking bodies 54 penetrates to an increasing extent into one of the receiving spaces 58 or 60 and the rotation-blocking bodies 54 engage against one side of the receiving spaces 58 and 60, rotation of the pivot-bearing body 14 is brought about and the set of rotation-blocking bodies 54a to 54c, for the purpose of fixing the pivot-bearing body 14 in a play-free manner, subjects the receiving spaces 58 or 60 to torques 90, 92 acting in opposite directions.

As is illustrated, for example, in FIGS. 10 to 13, the rotation-blocking body 54b has its lateral surface 84b engaging just against one side 86b of the guiding accommodating region 56b, for example the side which is located in the rotational direction 64, and is supported by an opposite region of its lateral surface 84b on a side 88b of the receiving space 58b which is located counter to the rotational direction 64, increasing movement of the rotation-blocking body 54 in the radial direction in relation to the pivot axis 22 resulting in a torque 90 which acts, counter to the rotational direction 64, on the pivot-bearing body 14.

Furthermore, the rotation-blocking body 54c has its lateral surface 84c engaging against a side 86c of the guiding accommodating region 56c which is located counter to the rotational direction, and has an opposite region of the lateral surface 84c acting on one side 89c of the first receiving space 58c, this resulting in a torque 92 which acts, in the rotational direction 64, on the pivot-bearing body 14.

Figure 10:
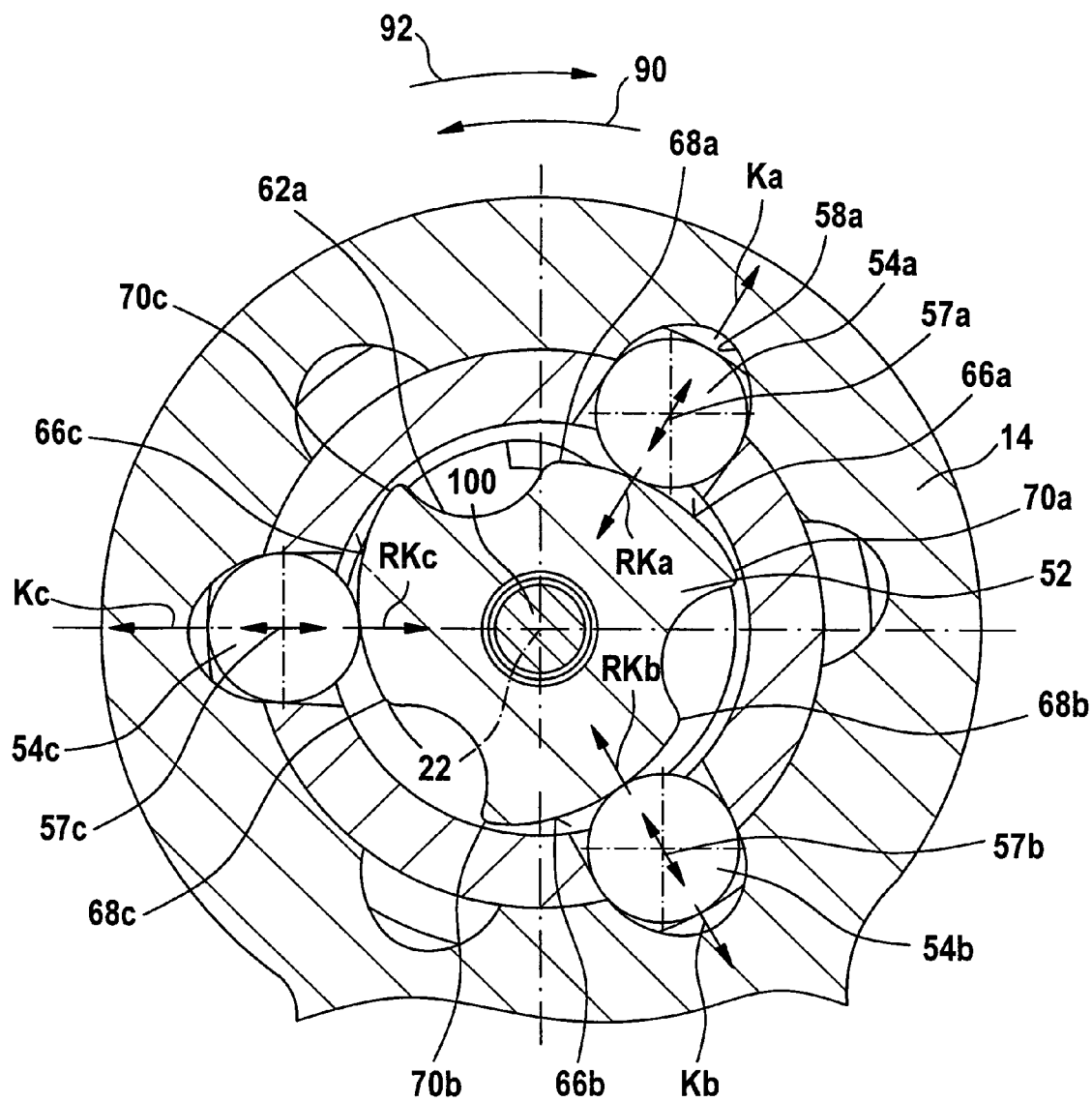
FIG. 10 shows an enlarged section corresponding to FIG. 5 with the pivot-bearing body blocked in a rotationally fixed manner by means of the rotation-blocking bodies.
Figure 11:
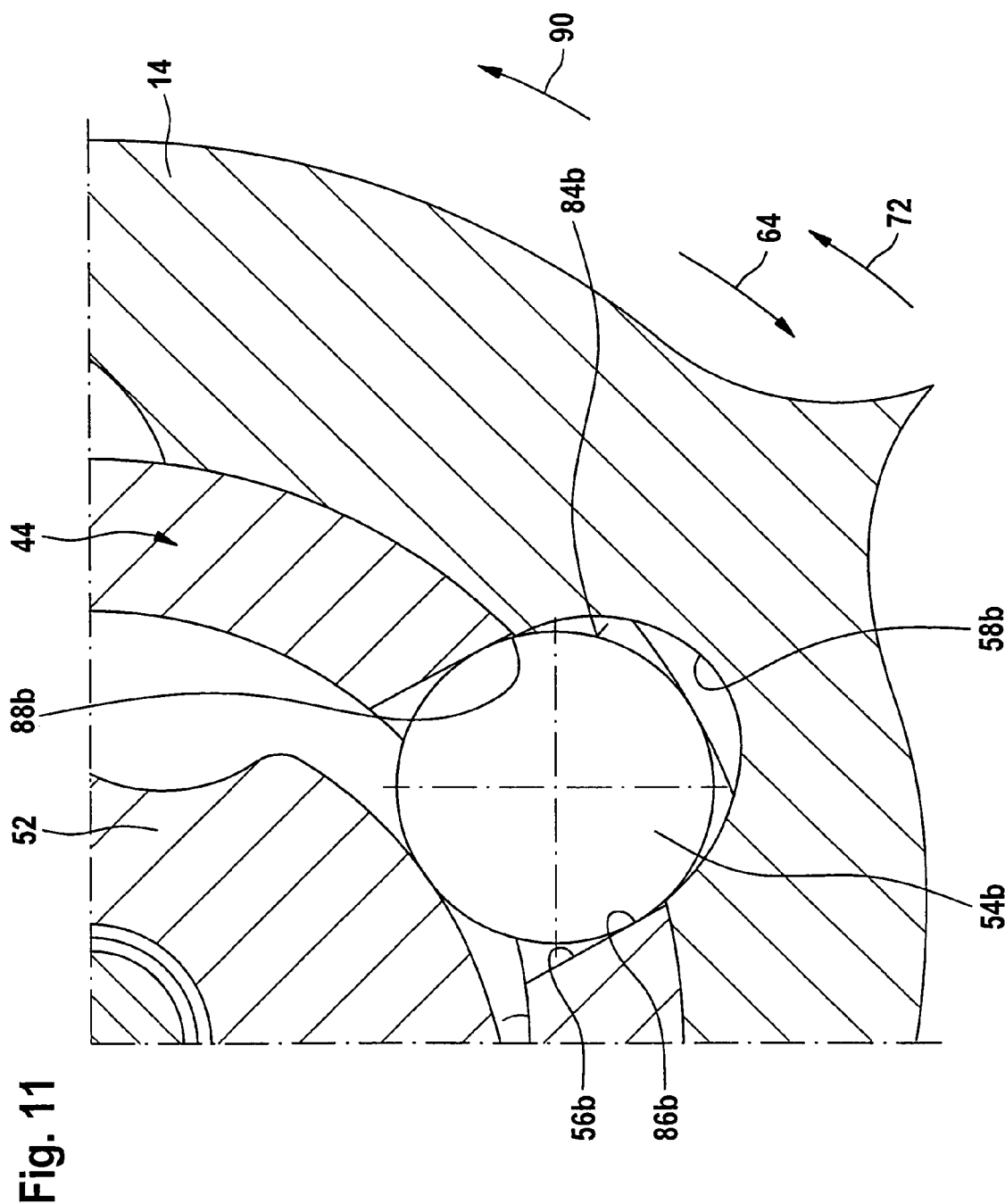
FIG. 11 shows an illustration, which is enlarged in detail form, of the rotation-blocking element 54*b*.
Figure 12:
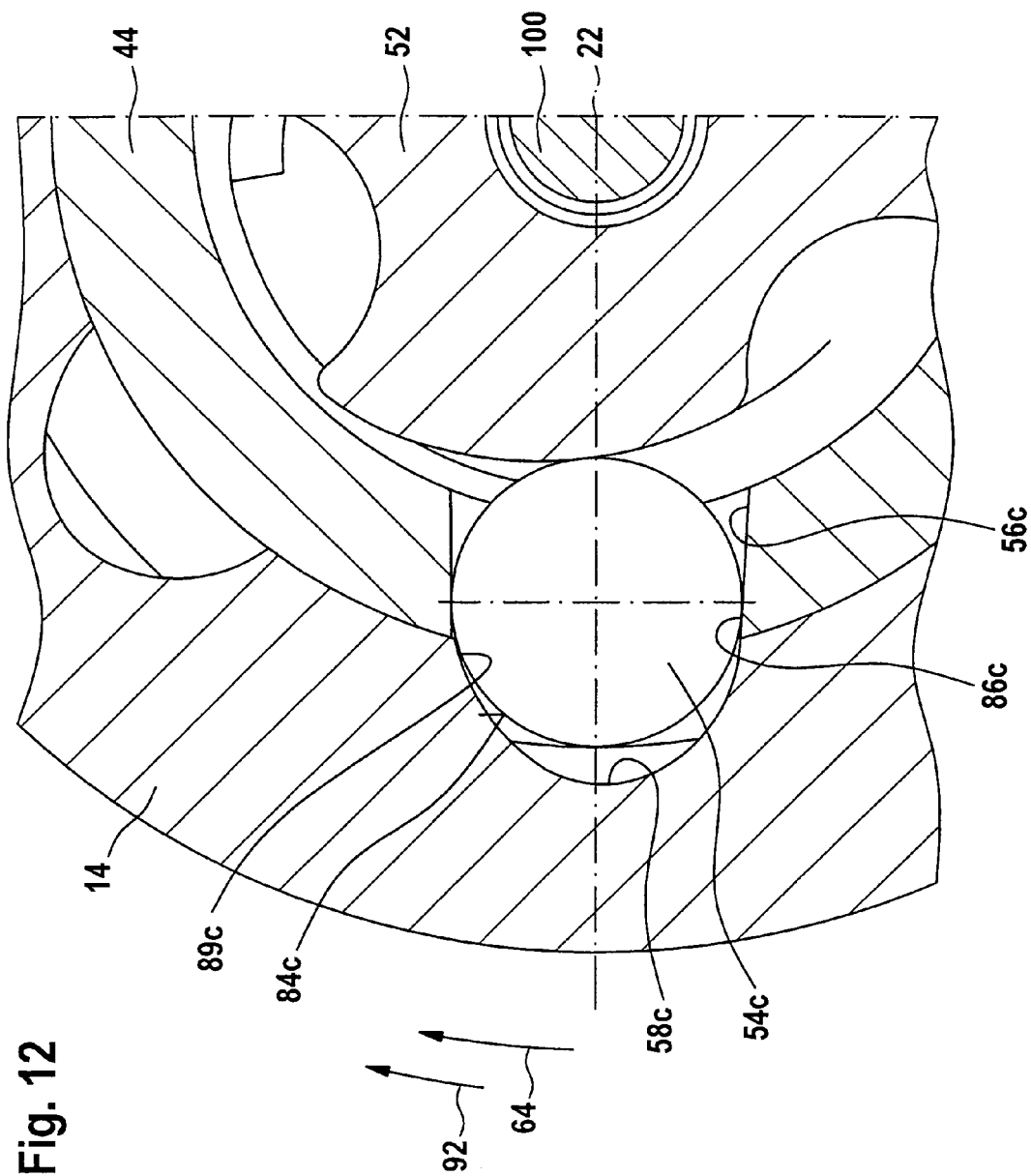
FIG. 12 shows an illustration, which is enlarged in detail form, of the rotation-blocking element 54*c*.

The torques 90 and 92 produced by the rotation-blocking bodies 54b and 54c thus act, as is illustrated in FIG. 10, in opposite directions to one another and allow the pivot-bearing body 14 to be secured in a play-free manner relative to the guide body 40, in particular to the guide sleeve 44 of the same, since the engagement of one side of the rotation-blocking bodies 54, on the one hand, in the guiding accommodating region 56 and, on the other hand, in the first receiving space 58, eliminates the play between the guiding accommodating region 56 and the rotation-blocking body 54 and the first receiving space 58 in the region of the two rotation-blocking bodies 54b and 54c.

Figure 13:
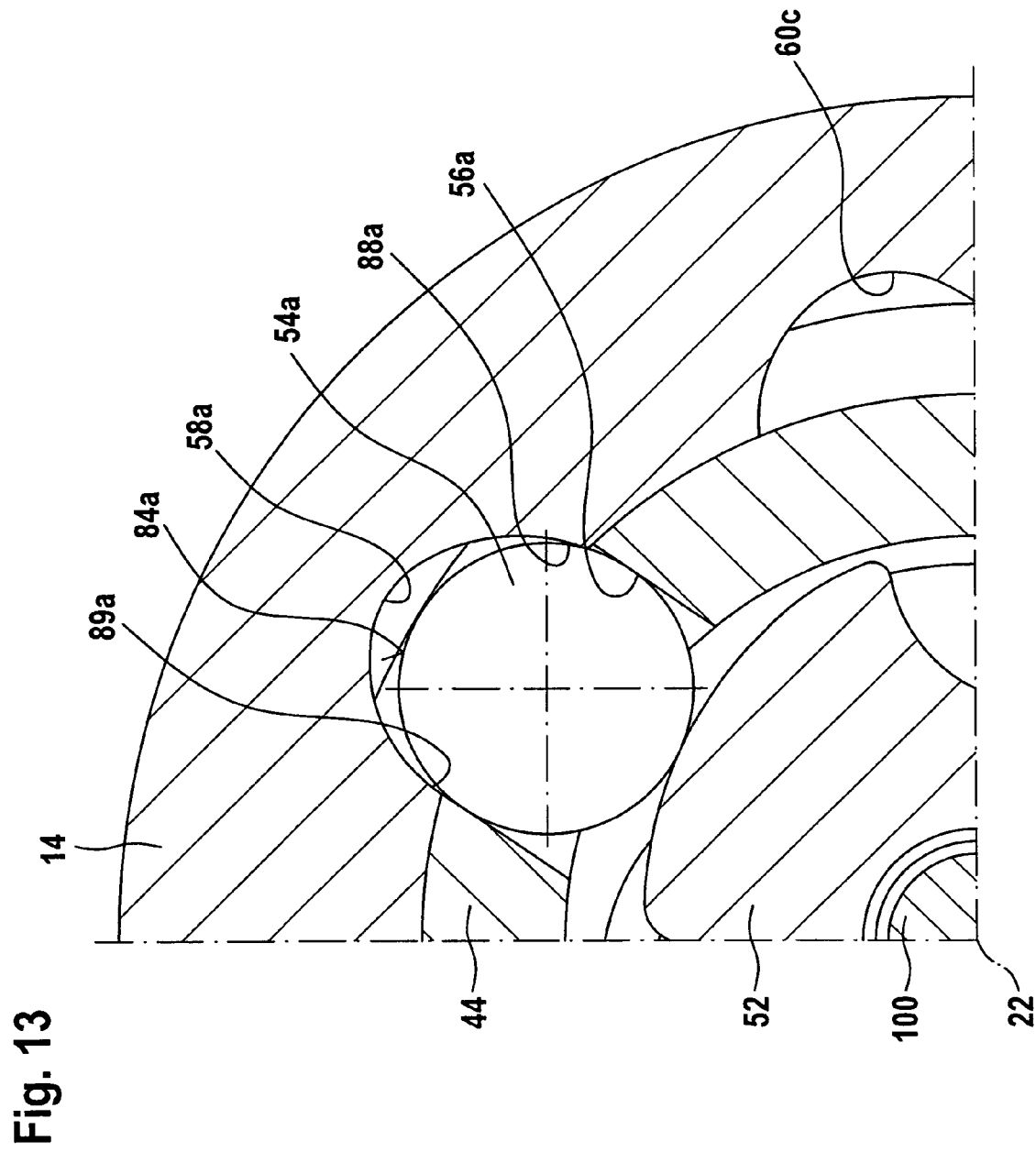
FIG. 13 shows an illustration, which is enlarged in detail form, of the rotation-blocking element 54*a*.

Furthermore, as is illustrated in FIG. 13, it is provided in the case of the rotation-blocking body 54a that the latter has its lateral surface 80a engaging both against the side 88a of the first receiving space 58a which is located in the rotational direction 64 and against the side 89a of the first receiving space 58a which is located opposite this side 88a, and thus, depending on the production tolerance in the region of the guiding accommodating region 56a and of the corresponding receiving space 58a, and depending on the loading of the ball neck 10 in trailer operation, usually contributes to one of the two torques 90 and 92 and thus usually also serves, in addition to the rotation-blocking body 54b or 54c loaded by the ball neck 10, to absorb load, although a state in which the rotation-blocking body 54a cannot contribute to either of the two torques 90 and 92 is also possible.

In order to make it possible for the actuating body 52 to act on each of the three rotation-blocking bodies 54 to the optimum extent in each case, it is provided that, in the active position, the actuating body 52 is centered in accordance with the position of the rotation-blocking bodies 54, and the actuating body 52, as is illustrated in FIGS. 4, 6 and 8, is thus mounted on a guide pin 100 by way of a central bore 96, via an interspace 98, so that, on account of the play relative to the guide pin 100 which is produced by the interspace 98, the actuating body 52 can center itself in accordance with the production-tolerance-induced position of the rotation-blocking bodies 54 within the guide body 40, it being possible for the self-centering of the actuating body 52 to deviate slightly from a coaxial arrangement in relation to the guide pin 100 and thus in relation to the geometrical pivot axis 22.

On account of the self-centering, the rotation-blocking bodies 54a, 54b and 54c subject the receiving spaces 58a, 58b and 58c or 60a, 60b and 60c to approximately equal forces Ka, Kb and Kc in the respective guide direction 57a, 57b and 57c, so that the reaction forces RKa, RKb and RKc acting on the actuating body 52 are also approximately equal.

In the case of the illustrated exemplary embodiment of the solution according to the invention, the rotation-blocking bodies 54 are disposed in the guiding accommodating regions 56 at equal angular spacings around the pivot axis 22, so that the reaction forces RKa, RKb, RKc on one of the rotation-blocking bodies 54a, 54b, 54c, these reaction forces being approximately equal as a result of the self-centering, act equally on the other rotation-blocking bodies 54b and 54c, 54a and 54c and 54a and 54b and thus cancel one another overall, so that the actuating body 52 is in a state of force equilibrium and does not require any additional support.

The rotation-blocking bodies 54, as is illustrated in FIGS. 4, 6 and 8, are preferably formed as rollers, in particular circular-cylindrical rollers, which thus engage, on the one hand, linearly against the actuating body 52 and, on the other hand, also linearly against the receiving spaces 58 or 60. In this case, the receiving spaces 58, 60 are formed as depressions which have a constant cross-sectional shape in the direction parallel to the pivot axis 22, the cross-sectional shape being based more or less on part of a circle.

For this reason, the interspace 98 is also selected to be of such a magnitude that the actuating body 52 can even execute a slight rocking movement relative to the geometrical pivot axis 22 and can thus adapt itself to the linear engagement of all three rotation-blocking bodies 54 against all three receiving spaces 58 or 60 in each case.

The guide pin 100 thus provides just very rough rotatable mounting of the actuating body 52 relative to the pivot axis 22, this mounting being relevant primarily when the actuating body 52 retains the rotation-blocking bodies 54 in a release position, in which the rotation-blocking bodies 54 penetrate into the retraction receiving spaces 62 of the actuating body 52.

In order for the actuating body 52 always to move such that the rotation-blocking bodies 54 move in the direction of the blocking position, the actuating body 52 is subjected to the action of a torsion spring 102 which, on the one hand, acts on the actuating body 52 and, on the other hand, is supported on the guide body 40.

The torsion spring also results in the situation where the actuating body 52, under the action of force, pushes the rotation-blocking bodies 54 into the receiving spaces 58 or 60, and the pivot-bearing body is thus fixed in a play-free manner, the freedom from play also being maintained, in the case of the geometry of the receiving spaces 58, 60 changing on account of the loading during operation, by the actuating body 52 rotating further in the direction of rotation 72.

The guide body 40 preferably extends, by way of its guide sleeve 44, up to a cover 104 which, on a side which is located opposite the flange 42, closes off an inner space 106 enclosed by the guide sleeve 44.

In the inner space 106, the torsion spring 102 follows the cover 104, and the torsion spring is followed by the actuating body 52, which extends through the entire guide sleeve 44 and the flange 42 and a through-passage 108 in the carrier plate 26.

Furthermore, the guide pin 100 is provided with an end threaded portion 112 and is screwed, by way of the latter, into a threaded bore 114 in the cover 104, so that the guide pin 100 is kept oriented coaxially in relation to the pivot axis 22 by the cover 104.

Moreover, the guide sleeve 44 has, following the cover 104, on the outside, a threaded portion 116, which is set back radially in relation to the outer lateral surface 46 and onto which a retaining ring 120 can be screwed, this retaining ring, together with the flange 42, forming an axial guide for the pivot-bearing body 14. The pivot-bearing body 14 is thus guided between the screwed-on retaining ring 120 and the flange 42 in respect of movement in the direction of the pivot axis 22, end surfaces 122 and 124 of the pivot-bearing body 14 engaging with sliding action against annular surfaces 126 and 128 of the flange 42 and of the retaining ring 120, respectively.

For the purpose of sealing the pivot-bearing body 14, which can be rotated relative to the guide body 40, in relation to the guide body, both the flange 42 and the retaining ring 120 are each provided with an all-round seal 132, 134, respectively, which each engage with sliding action against the end surfaces 122, 124 by way of respective lips 136 and 138, so that the pivot-bearing unit 20 is sealed against the ingress of moisture and dirt during a pivoting movement of the ball neck 10 with the pivot-bearing body 14.

In order for it to be possible to move the actuating body 52 from the active position into the inactive position counter to the force of the torsion spring 102, an actuating arrangement which is designated as a whole by 150 is provided.

As is illustrated in FIGS. 4, 6 and 8, this actuating arrangement 150 comprises a rotary drive element 152 which can be rotated relative to the actuating body 52, and is likewise mounted in a rotatable manner on the guide pin 100.

As is illustrated in FIGS. 4, 6 and 8, the rotary drive element 152 comprises a pull-cable rest 154 on which a pull cable 156 rests, this cable, as is illustrated in FIG. 3, being guided, via a cable pull 158, to an actuating element, for example an actuating handle, which will not be described any more specifically.

The pull cable 156 here, as is likewise illustrated in FIG. 3, is fixed on the rotary drive element 152 by an end bearing body 162 and, starting from the bearing body 162, extends over the pull-cable rest 154, which is provided on the rotary drive element 152.

Figure 14:
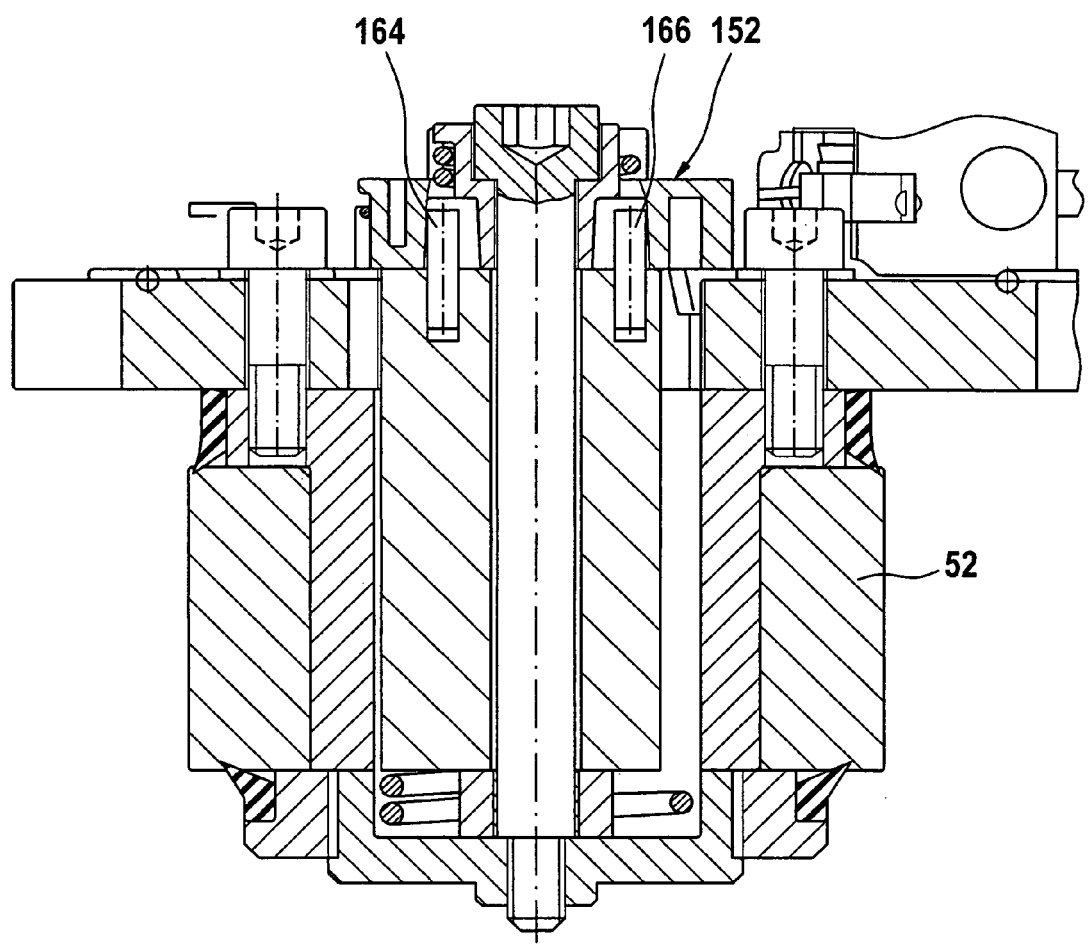
FIG. 14 shows a section along line 14-14 in FIG. 17.

As is illustrated in FIG. 14, the rotary drive element 152 is coupled to the actuating body 52 via carry-along devices 164, 166, the carry-along devices 164 and 166—as is described hereinbelow—being connected to the rotary drive element 152 such that, starting from a starting position, the latter can rotate freely to a limited extent relative to the actuating body 52 without acting on the carry-along devices 164, 166, and it is only when a carry-along position is reached that rotation of the actuating body 52, driven by the rotary drive element 152, takes place.

The reason for this is that the rotary drive element 152 does not just serve for causing the actuating body 52 to rotate from its fixing position into the release position; rather, it also serves, at the same time, to move a rotation-prevention means 170 for the actuating body 52, this means being illustrated in FIG. 3, from a securing position into a disengaged position.

As is illustrated in FIGS. 15 to 18, the rotation-prevention means 170 comprises a securing lever 172 which is mounted on a bearing journal 174, which is fixed relative to the carrier plate 26, such that it can be pivoted about an axis 176, the securing lever 172 extending in a plane 178 which runs approximately parallel to the pivot axis 22.

Figure 17:
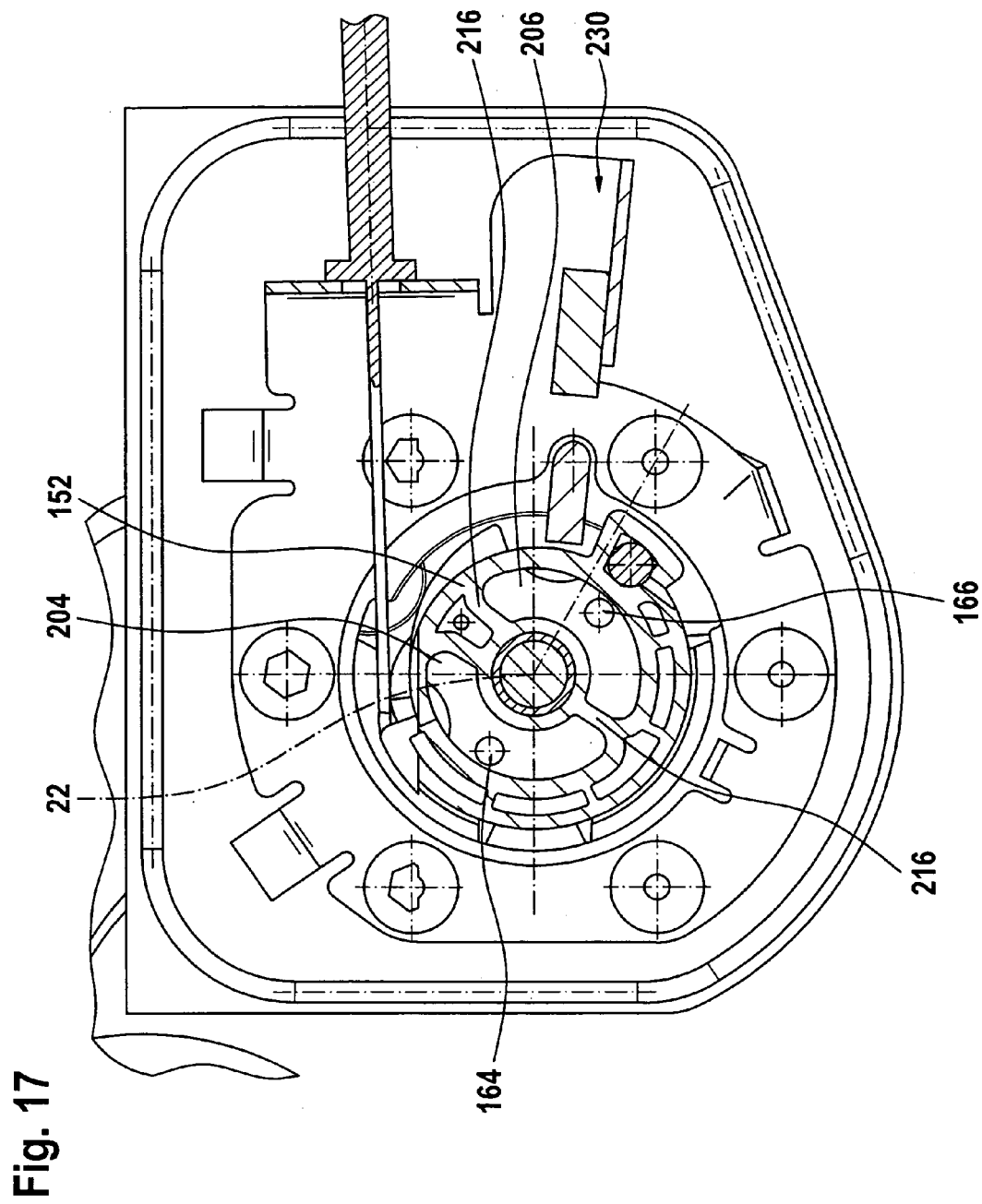
FIG. 17 shows a plan view similar to FIG. 16, this time along a section plane along line 17-17 in FIG. 18, in a starting position of the actuating arrangement and a securing position of the safety device.
Figure 18:
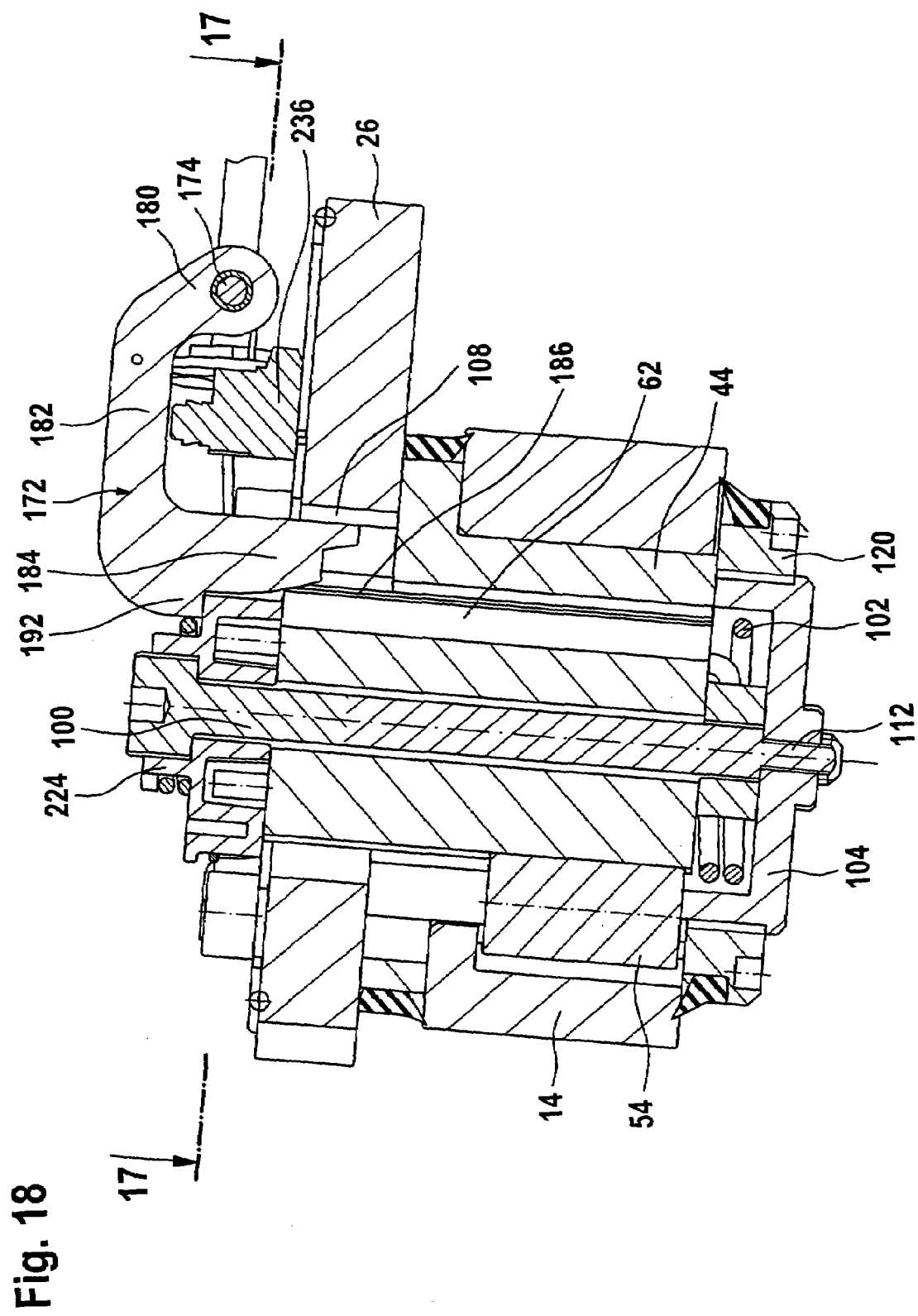
FIG. 18 shows a section along line 18-18 in FIG. 16.

The securing lever 172 is provided with a bearing portion 180 which has the bearing journal 174 passing through it, and, starting from the bearing portion 180, the securing lever extends, by way of a bracket portion 182, to a securing portion 184 which, as is illustrated in FIGS. 17 and 18, engages in the through-passage 108 of the carrying plate 26, to be precise such that the securing portion 184 is located in the region of one of the retraction receiving spaces 62 if the actuating body 52 is located in its active position. The securing portion 184 thus prevents rotation of the actuating body 52 such that the rotation-blocking bodies 54 can enter into one of the retraction receiving spaces 62 and pass into their release position.

In particular, the securing portion 184 is located such that, in the case of a rotary movement of the actuating body 52, a step 186 which is provided at the transition between the retraction receiving spaces 62 and the preceding pressure-exerting surface 66, as seen counter to the rotational direction 64, would run against the securing portion 184 as long as the securing lever 172 is located in its securing position. This securing position is maintained by a torsion spring 188 acting on the securing lever.

Figure 15:
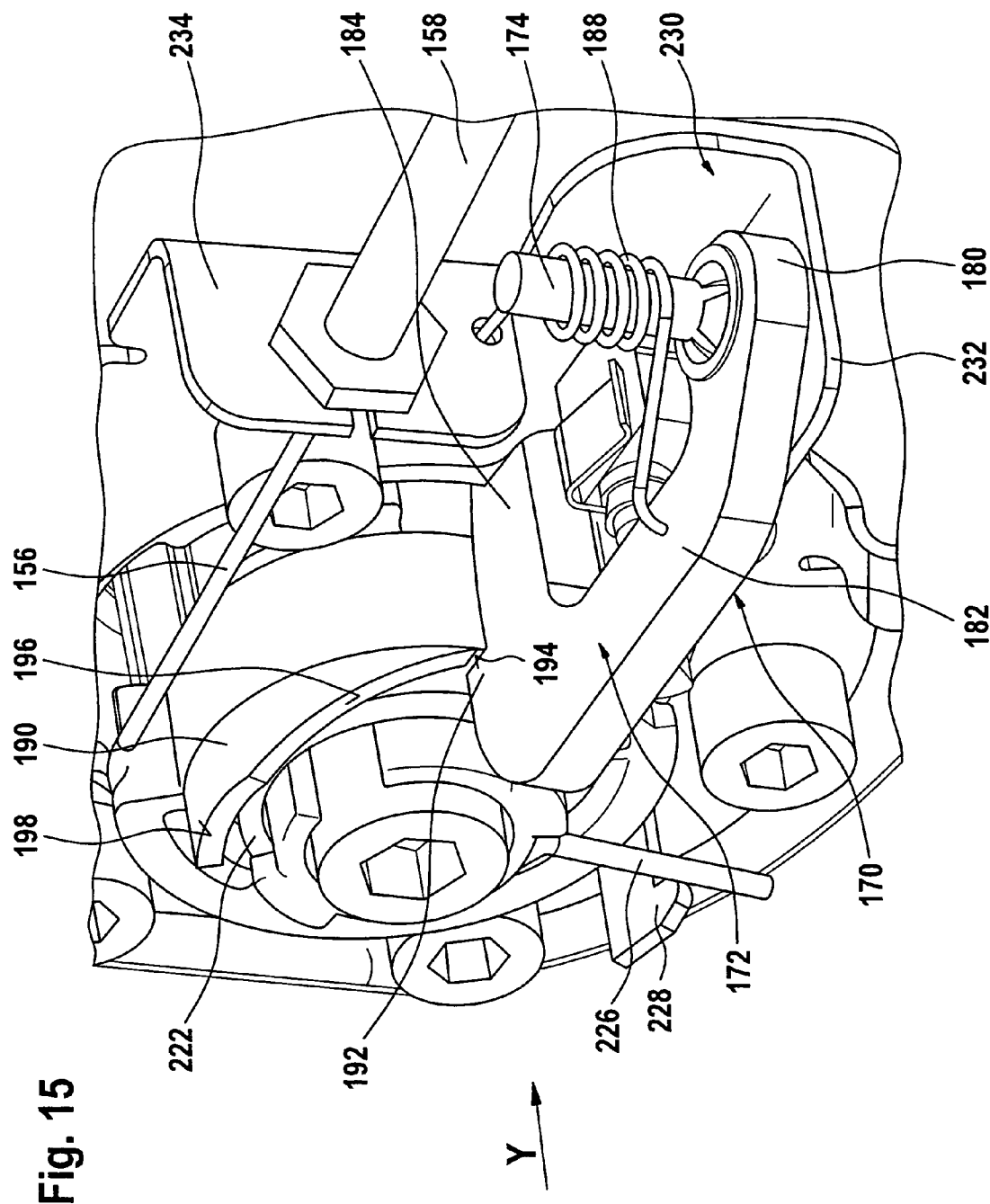
FIG. 15 shows a perspective illustration, in detail form, similar to FIG. 3 with an actuating arrangement illustrated in a starting position and a safety device illustrated in a securing position.
Figure 16:
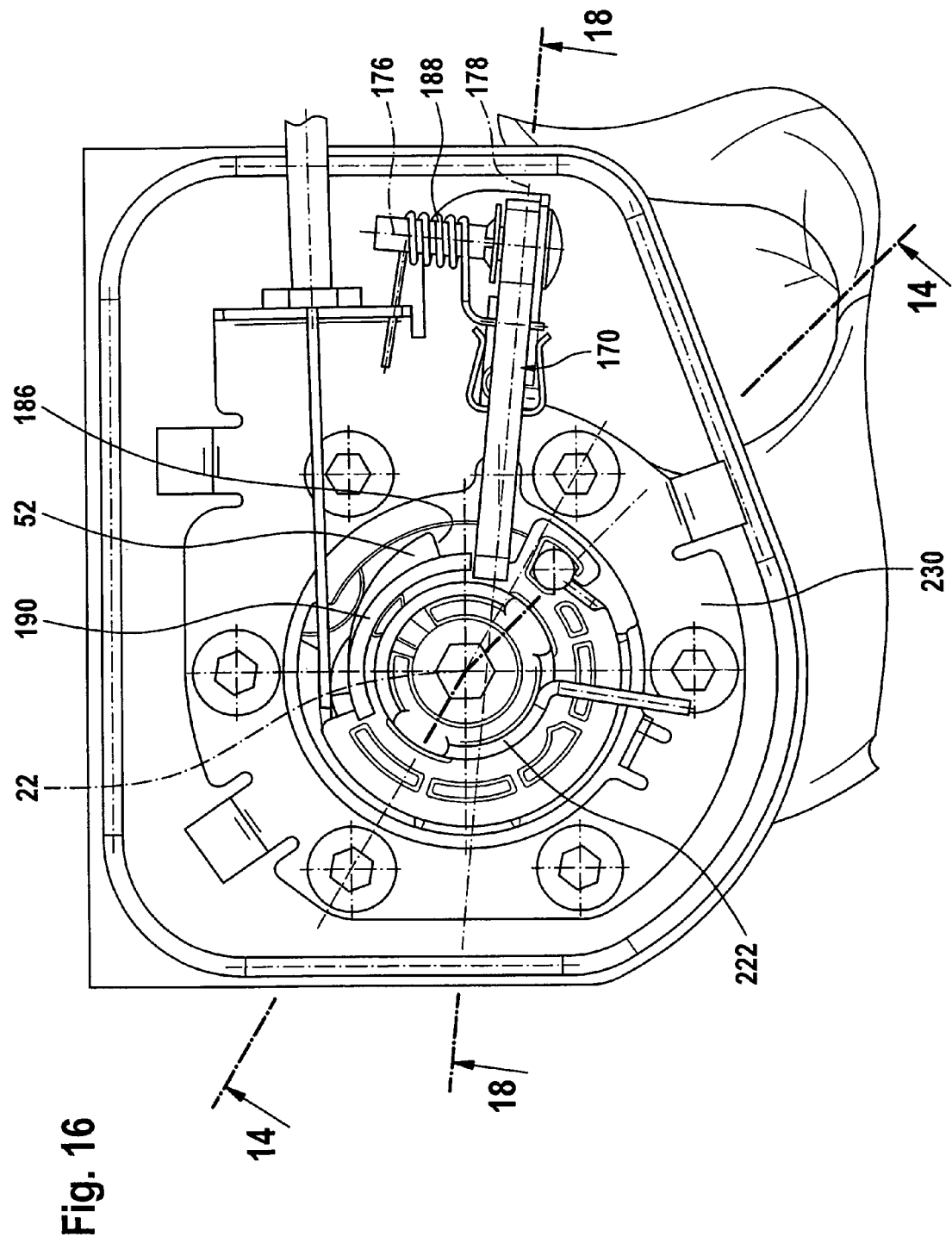
FIG. 16 shows a plan view in the direction of arrow Y in FIG. 15 in a starting position of the actuating arrangement and a securing position of the safety device.

In order to pivot the securing lever 172 out of the securing position, the rotary drive element 152, as is illustrated in FIG. 15, is provided with an actuating cam 190, which interacts with an actuating nose 192 on the securing lever 172.

The actuating cam 190 here comprises a first bearing surface 194, on which the actuating nose 192 rests when the securing lever 172 is located in its securing position.

The actuating cam 190 comprises a lifting surface 196 which extends from the first bearing surface 194, slopes up from the first bearing surface 194 to a second bearing surface 198 and is capable, by acting on the actuating nose 192, of moving the securing lever 172 in the direction of a disengaged position.

Figure 19:
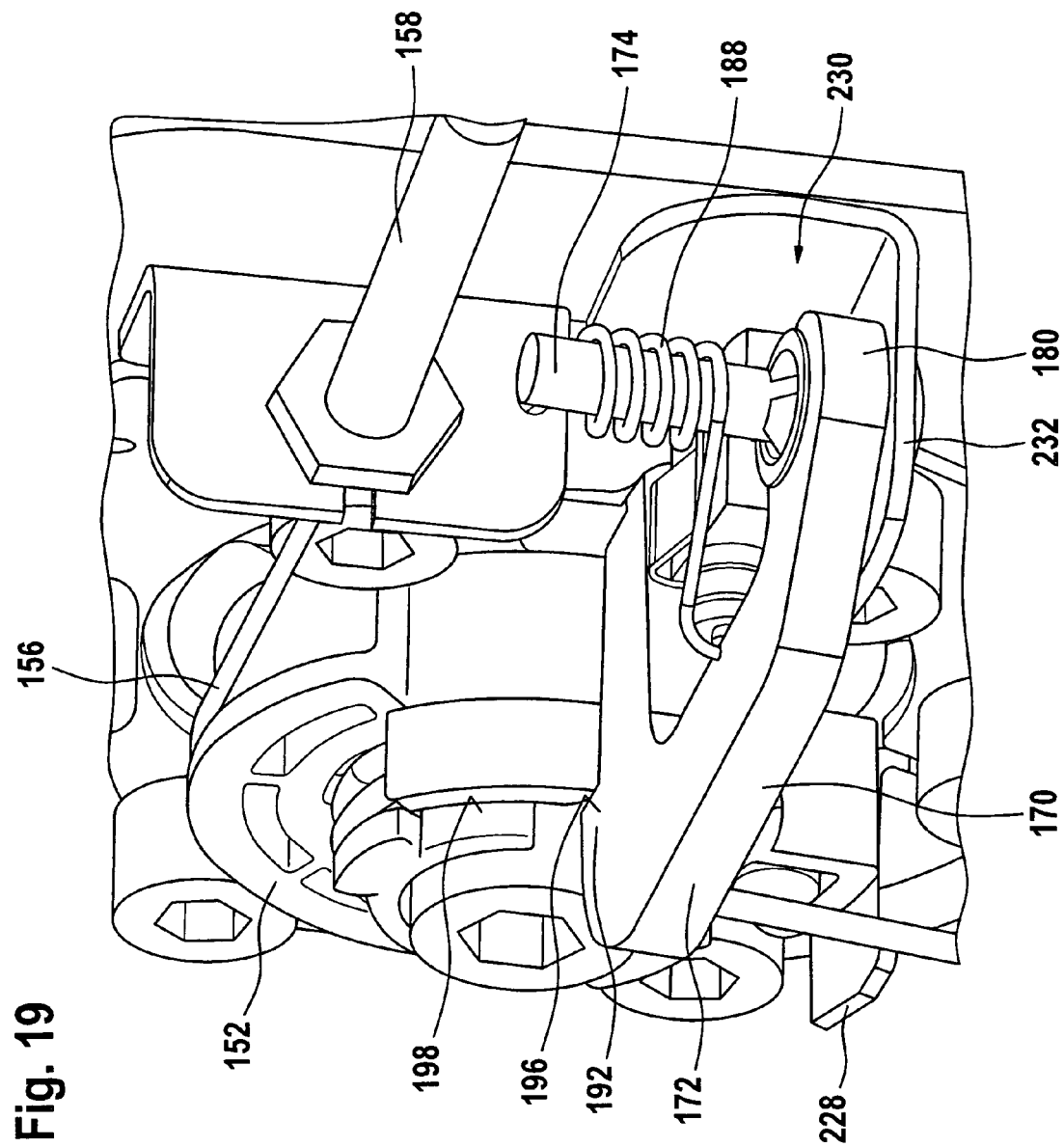
FIG. 19 shows a perspective illustration similar to FIG. 15 in an intermediate position of the actuating arrangement and a disengaged position of the safety device.
Figure 24:
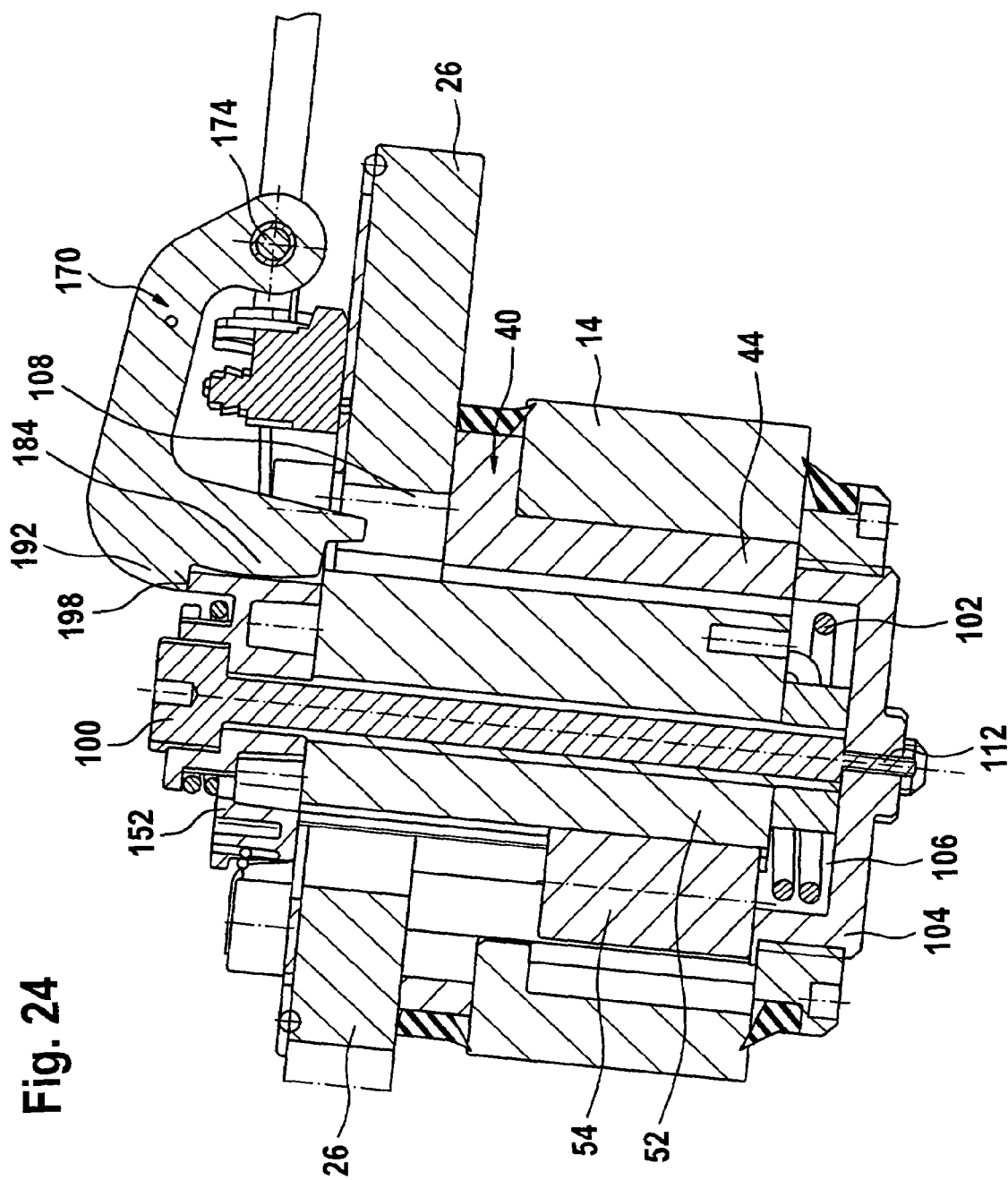
FIG. 24 shows a section corresponding to FIG. 18 in the actuating position of the actuating arrangement.

For this purpose, as is illustrated in FIG. 19, the securing lever 172 is pivoted about the axis 176 such that, as is illustrated in FIG. 24, the securing portion 184 is moved out of the through-passage 108 in the carrying plate 26 and no longer obstructs rotation of the actuating body 52 by the step 186.

Figure 21:
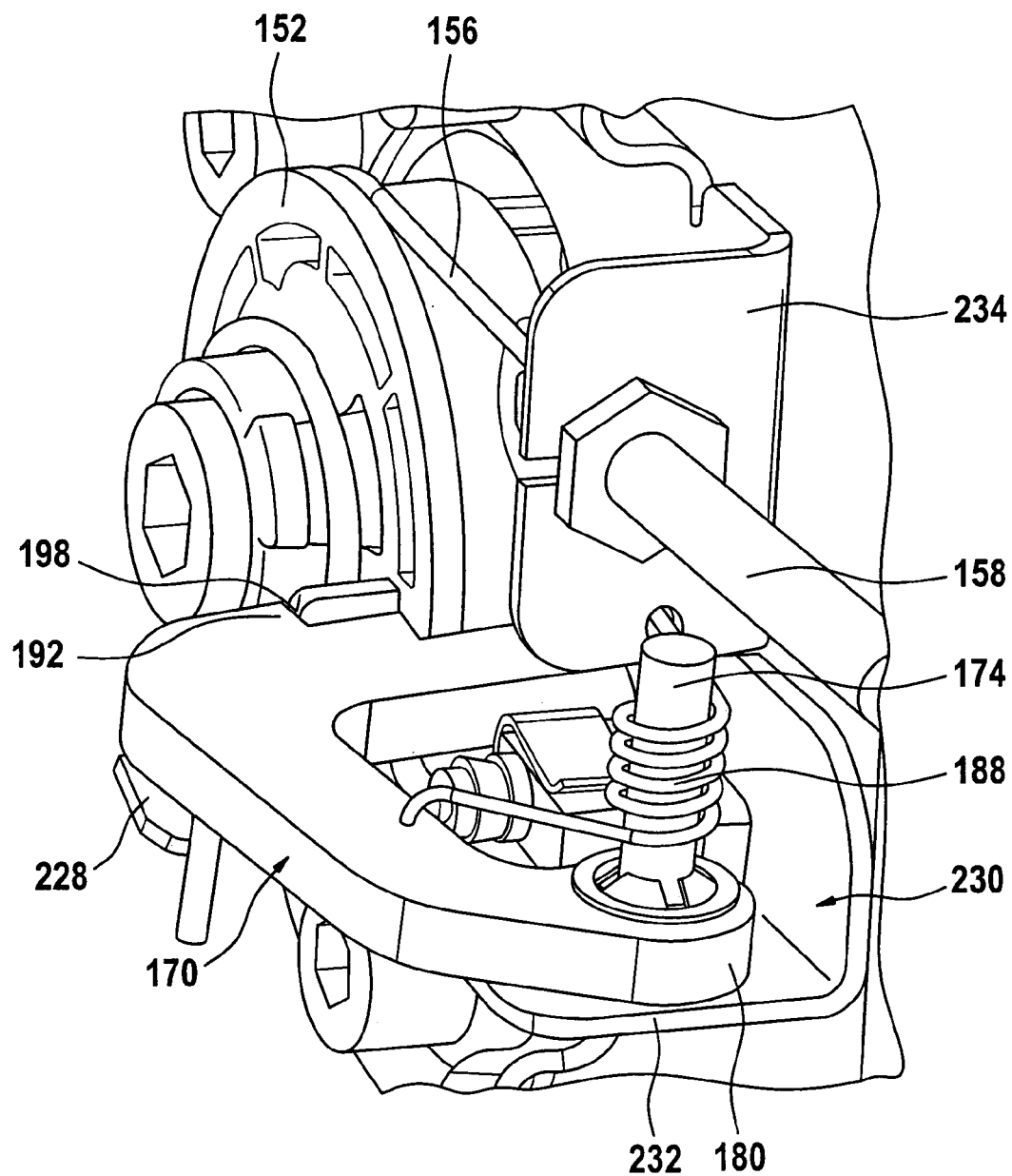
FIG. 21 shows a perspective illustration similar to FIG. 15 in an actuating position of the actuating arrangement and a disengaged position of the safety device.

This disengaged position is achieved when the actuating nose 192 has been raised, by the lifting surface 196, to the second bearing surface 198 and rests on the latter, as is illustrated, for example, in FIGS. 19, 21 and 24.

The actuating cam 190 of the rotary drive element 152 co-ordinates the rotation of the rotary drive element 152 and the rotary movement of the actuating body 52 which is initiated by the rotary drive element, as is described hereinbelow.

As is illustrated in FIG. 17, the two carry-along devices 164 and 166 enter into recesses 204 and 206 provided for this purpose in the rotary drive element 152, the recesses 204 and 206 being bounded by carry-along elements 214 and 216, which, in the exemplary embodiment illustrated, are formed as termination walls of the recesses 204 and 206. In a starting position of the rotary drive element 152, which is illustrated in FIGS. 15 to 18, these carry-along elements 214 and 216 are spaced apart from the carry-along devices 164 and 166.

In this starting position of the rotary drive element 152, the actuating nose 192, on account of the torsion spring 188, rests on the first bearing surface 194, so that the securing lever 172 is thus located in its securing position and uses the securing portion 184 to block rotary movement of the actuating body 52 from its active position into its inactive position.

The spacing of the carry-along elements 214 and 216 from the carry-along devices 164 and 166, respectively, thus allows the rotary drive element 152 to rotate about the pivot axis 22 through a free-travel angle, in a free-travel state, without the actuating body 52 being carried along.

The free-travel angle of the rotation of the rotary drive element 152 here corresponds to the angle over which the lifting surface 196 extends on the actuating cam 190, so that the rotary drive element 152 can be rotated with the actuating cam 190, without the actuating body 52 being carried along, to the extent where the securing lever 172, by the action of the lifting surface 196 on the actuating nose 192, has been pivoted into its disengaged position, in which the securing portion 184 no longer blocks the rotary movement of the actuating body 52.

Figure 20:
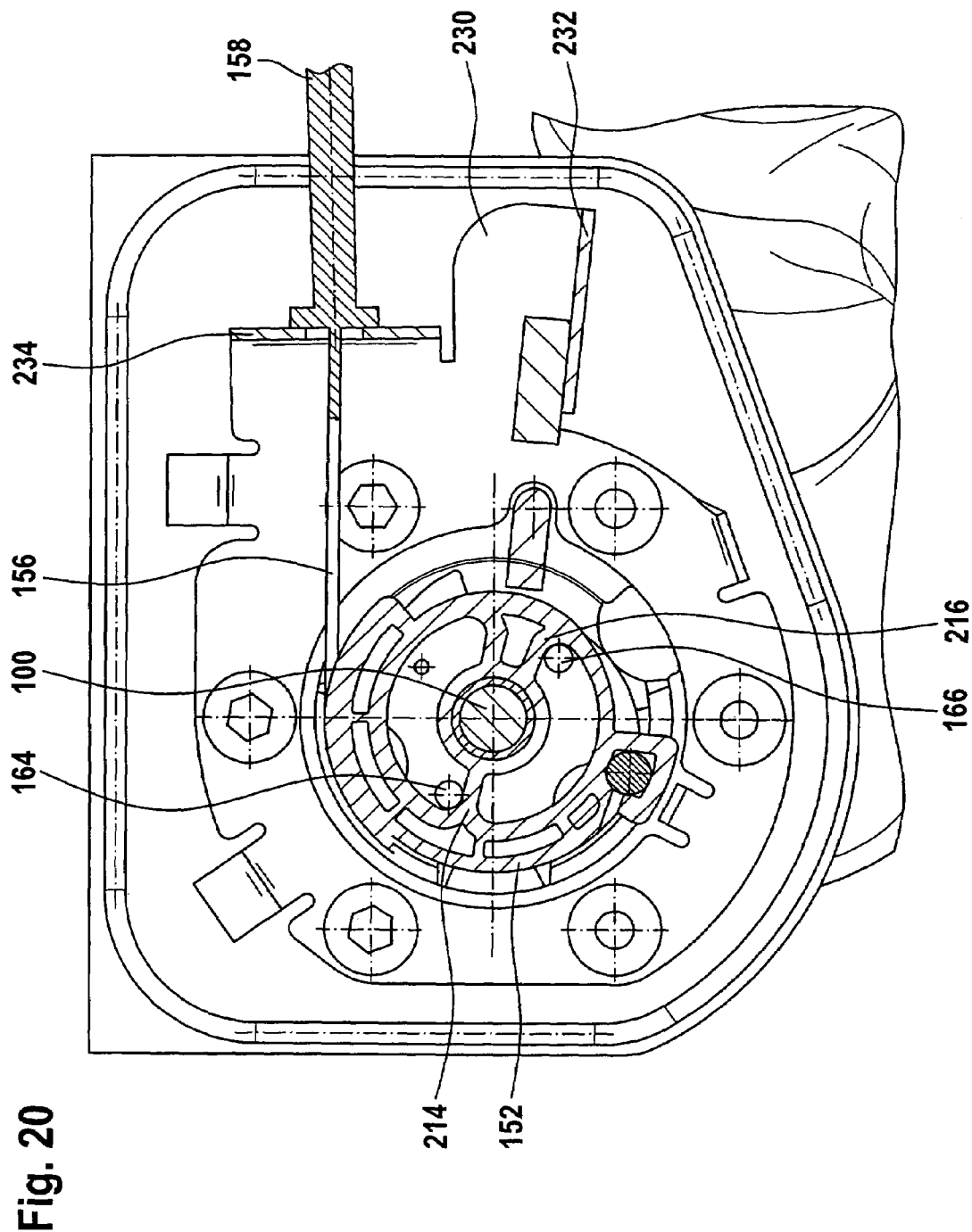
FIG. 20 shows a plan view corresponding to FIG. 17 in the intermediate position according to FIG. 19.

This intermediate position of the rotary drive element 152 is illustrated in FIGS. 19 and 20, it being possible to see, in the intermediate position, that the carry-along elements 214, 216 engage against the carry-along devices 164 and 166, respectively.

Figure 22:
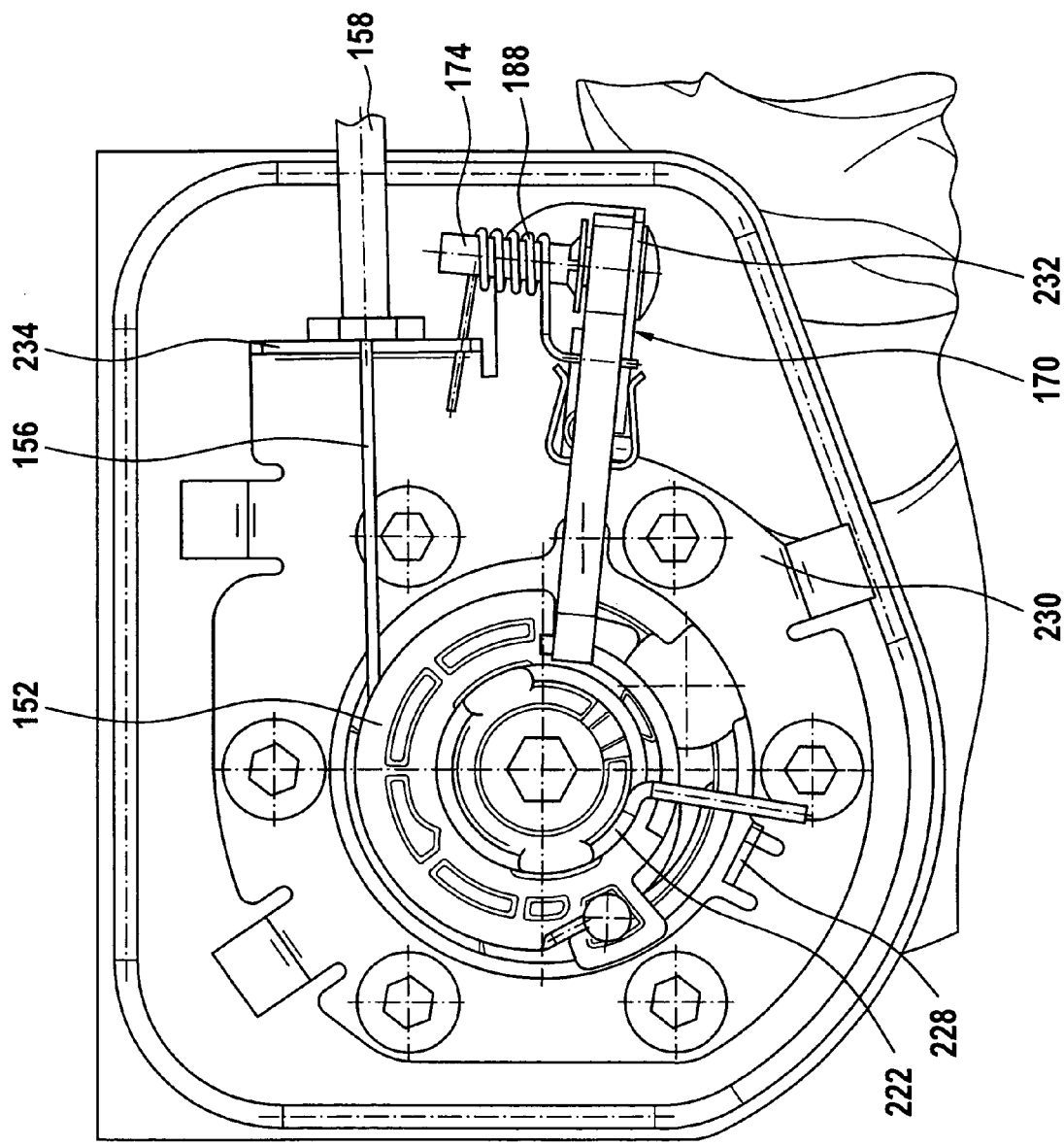
FIG. 22 shows a plan view similar to FIG. 16 in the actuating position of the actuating arrangement.
Figure 23:
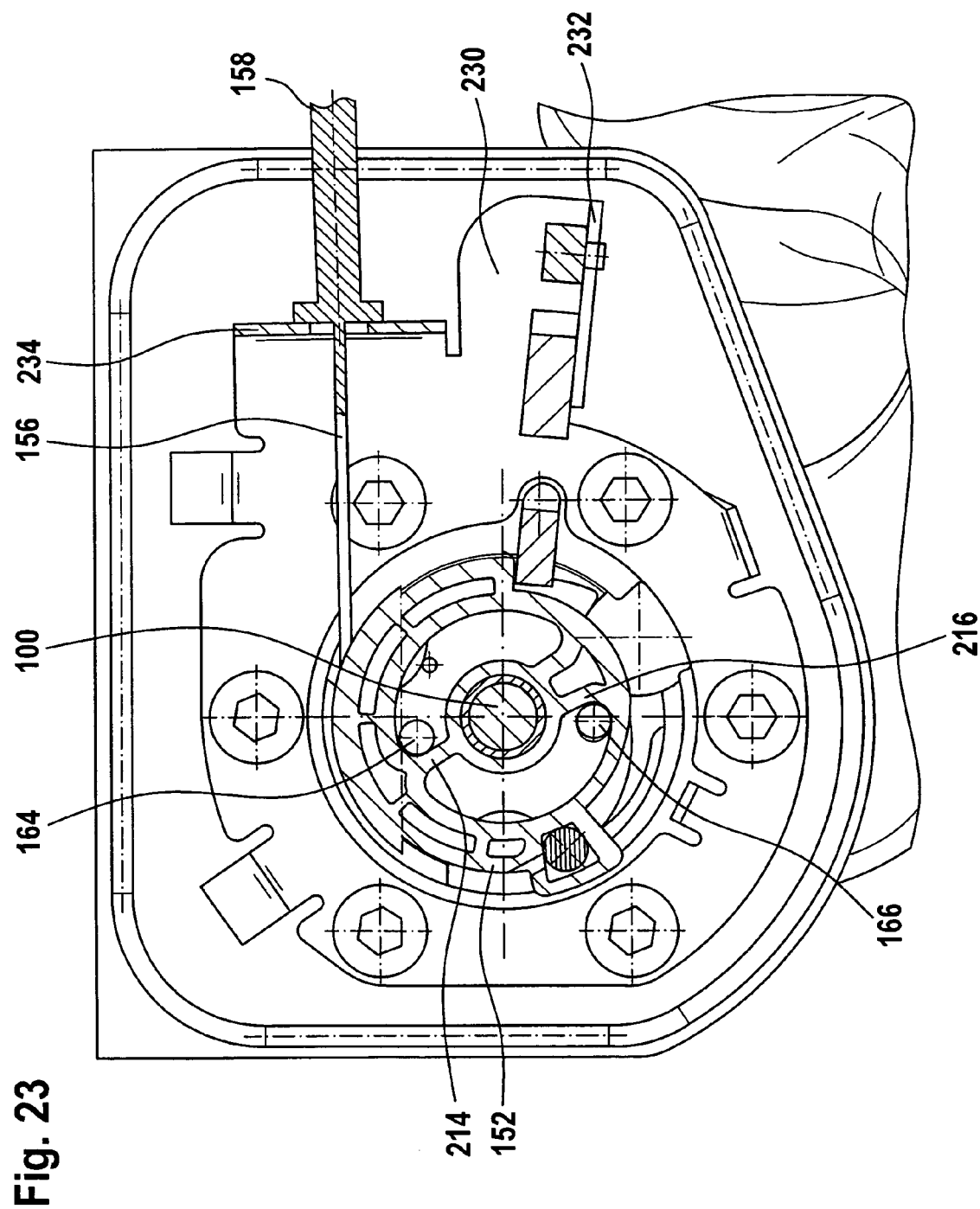
FIG. 23 shows a plan view similar to FIG. 17 in the actuating position of the actuating arrangement.

Further rotation of the rotary drive element 152 thus results in the actuating body 52 being rotated along in a carry-along state of the actuating arrangement 150, it being the case that, with the rotary movement of the rotary drive element 152 into the actuating position, which is illustrated in FIGS. 21 to 23, the actuating body 52 rotates in the direction 64 such that the rotation-blocking bodies 54 can pass into their release position and penetrate into the retraction receiving spaces 62 in the process.

At the same time, the actuating nose 192, as it moves into the actuating position, slides on the second bearing surface 198, which holds the securing lever 172 in the disengaged position, so that—as has already been described—it is possible for the actuating body 52 to be rotated into the inactive position without being obstructed by the securing portion 184 of the securing lever 172.

For this purpose, continuous, for example, manual action on the pull cable 156 is necessary since the actuating body 52 is already subjected to the action of the torsion spring 102.

Moreover, however, it is also the case that the rotary drive element 152 is subjected to the action of a torsion spring 222 such that, on account of the torsion spring 222, the rotary drive element 152 always tends to return into its starting position.

The torsion spring 222 here is supported by one leg on the rotary drive element 152 and wraps around a torsion-spring mount 224 of the rotary drive element 152 and, in addition, has a leg 226 which is supported on a supporting finger 228 of a retaining part, which is designated as a whole by 230 and, for its part, is fixedly connected to the carrying plate 26, the retaining part 230 also having a flange 232, which retains the bearing journal 174, and a flange 234, on which the cable pull 158 is supported.

In order, moreover, for it to be possible to sense the positions of the securing lever 172, it is also the case that a sensor 236 is mounted on the retaining part 230, this sensor sensing the positions of the bracket portion 182 of the securing lever 172 and, in particular, detecting whether the securing lever 172 is located in its securing position or has moved out of the same.

This results in the following overall function of the trailer coupling according to the invention.

If the trailer coupling according to the invention is either in the operating position A or the rest position R, then, without the actuating arrangement 150 being subjected to any, for example, manual action, the rotary drive element 152 is in its starting position, so that the rotation-blocking device 50 also blocks rotation of the pivot-bearing body 14 about the pivot axis 22 in a play-free manner.

This takes place in that the actuating body 52—as has already been described—on account of the action of the torsion spring 102, is located in its active position and the rotation-blocking bodies 54 in their blocking position, activated by force, engage in the receiving spaces 58 or 60.

Furthermore, with the rotary drive element 152 located in the starting position, the rotation-prevention means 170 is also located in its securing position since the securing lever 172, on account of the action of the spring 188, rests, by way of the actuating nose 192, on the first bearing surface 194 of the actuating cam 190 and thus blocks rotation of the actuating body 52 in so far as the latter—even if the torsion spring 102 were to fail—cannot at any time rotate into the inactive position and, consequently, to the extent where the rotation-blocking bodies 54 pass into their release position. Rather, the actuating body 52 is blocked against rotary movement by the securing lever 172, in particular the securing portion 184 of the same, such that the rotation-blocking bodies 54 always still rest on the pressure-exerting surfaces 66 of the actuating body 52 and are thus still retained, by the same, in a blocking position, in which the rotation-blocking bodies 54 engage either in the receiving spaces 58 or in the receiving spaces 60 and thus block rotary movement of the pivot-bearing body 14, even if this blocking is no longer play-free.

If the actuating arrangement 150 is then subjected to action, for example via the pull cable 156, then, in the first instance, the rotary drive element 152 is rotated in the free-travel state, which, without the actuating body 52 being rotated, results in the rotation-prevention means 170 passing from its securing position into its disengaged position and thus in it no longer being possible for the securing lever 172 to block rotary movement of the actuating body 52 from the active position into the inactive position. Once the intermediate position of the rotary drive element 152 has been reached, the latter also carries along on account of the carry-along state, via the carry-along devices 164, 166, the actuating body 52 in a further rotary movement, and thus moves the actuating body into the inactive position, the rotation-prevention means 170 simultaneously being retained in the disengaged position, namely in that the securing lever 172 remains in its disengaged position on account of the actuating nose 192 resting on the second bearing surface 198.

If the action on the actuating arrangement 150 is done away with, for example as a result of the pull cable 156 being released, then, under the action of the torsion spring 222 and of the torsion spring 102, the rotary drive element 152 and, together with it, the actuating body 52, rotate back, namely to the extent where the actuating body 52 has reached its active position and the rotation-blocking bodies 54, once again in their blocking position, engage in one of the receiving spaces 58 or 60. Furthermore, the rotary drive element 152 then rotates back further, under the action of the torsion spring 222, into the starting position, so that the rotation-prevention means 170, once again, passes into its securing position and secures the actuating body 52 against rotation such that it passes into the inactive position.

Figure 25:
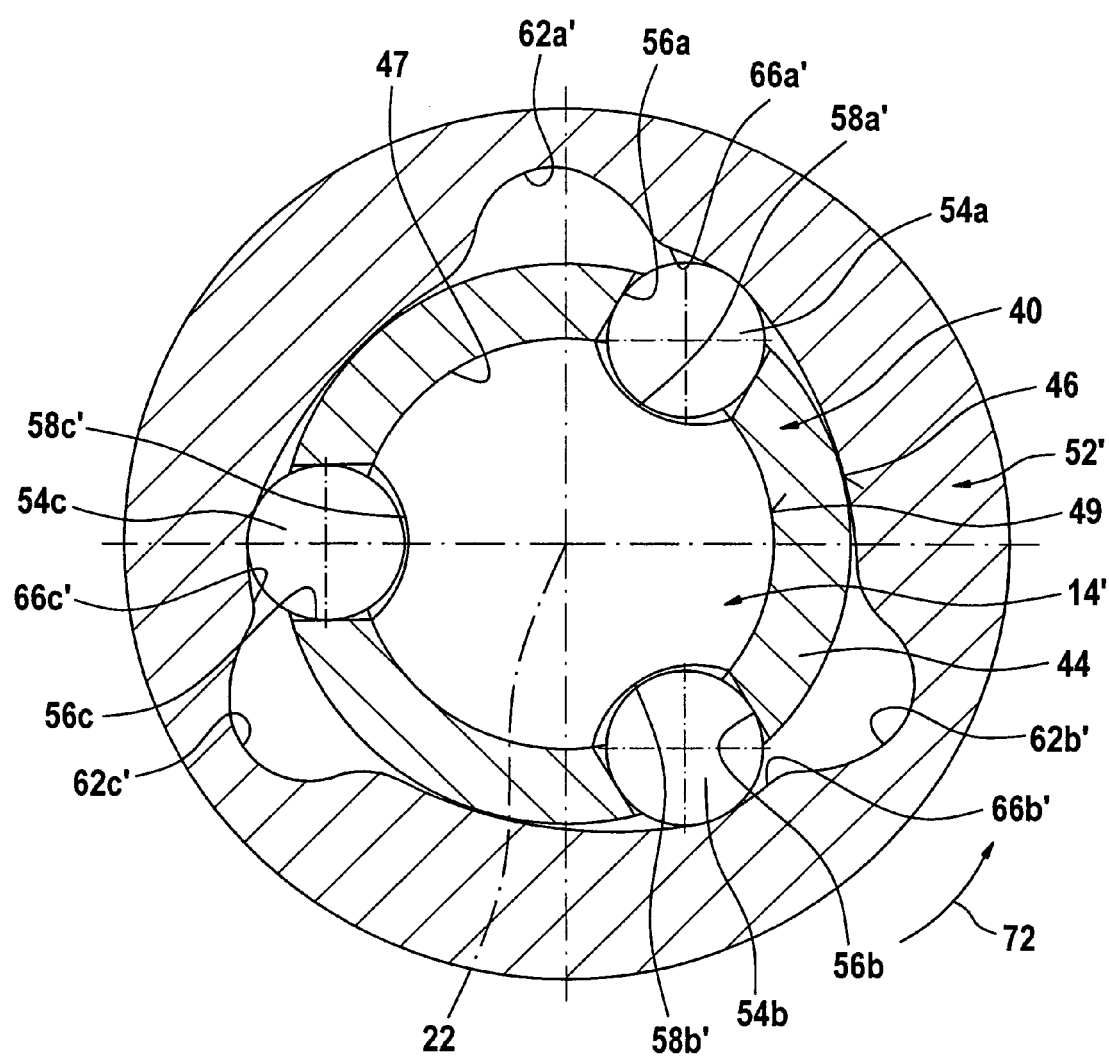
FIG. 25 shows a section similar to FIG. 5 through a second exemplary embodiment of a trailer coupling according to the invention.

In the case of a second exemplary embodiment of a trailer coupling according to the invention, this exemplary embodiment being illustrated in FIG. 25, the first end 12 of the ball neck is connected to a pivot-bearing body 14' which is located in the interior of the guide body 40 and is guided therein such that it can be rotated about the pivot axis 22, in which case, for example, a cylindrical outer surface 49 of the pivot-bearing body 14' and a cylindrical inner lateral surface 47 of the guide sleeve 44 form the rotatable guide of the pivot-bearing body 14'.

Furthermore the pivot-bearing body 14' is provided with the receiving spaces 58a', 58b' and 58c' for the rotation-blocking bodies 54a, 54b and 54c, into which the rotation-blocking bodies 54a, 54b and 54c project in their blocking position and, in the process, bring about blocking of the pivot-bearing body 14' in the same way as has been described in conjunction with the first exemplary embodiment.

In the case of this exemplary embodiment, furthermore, the actuating body 52' is disposed such that it enclosed the guide sleeve 44 over its outer lateral surface 46 and has the retraction receiving spaces 62a', 62b' and 62c' with pressure-exerting surfaces 66a', 66b' and 66c' following the latter, so that, by virtue of the actuating body 52' being rotated in the direction of rotation 72, the rotation-blocking bodies 54a, 54b and 54c can be moved into their blocking position and, in the process, are subjected to the action of the pressure-exerting surfaces 66a', 66b' and 66c', whereas, in the case of the actuating body 52' being rotated counter to the direction of rotation 72, the rotation-blocking bodies 54a, 54b and 54c can be transferred into their release position, when they can penetrate into the retraction receiving spaces 62a', 62b' and 62c'.

Otherwise, the second exemplary embodiment of the trailer coupling according to the invention functions in a manner analogous to the first exemplary embodiment, so that, in respect of the basic functions, reference can be made in full to what has been said for the first exemplary embodiment.

The second exemplary embodiment has the advantage that, for example, the actuation of the actuating body 52' can thus be simplified since this actuating body is easily accessible from its outer circumferential side.

Figure 26:
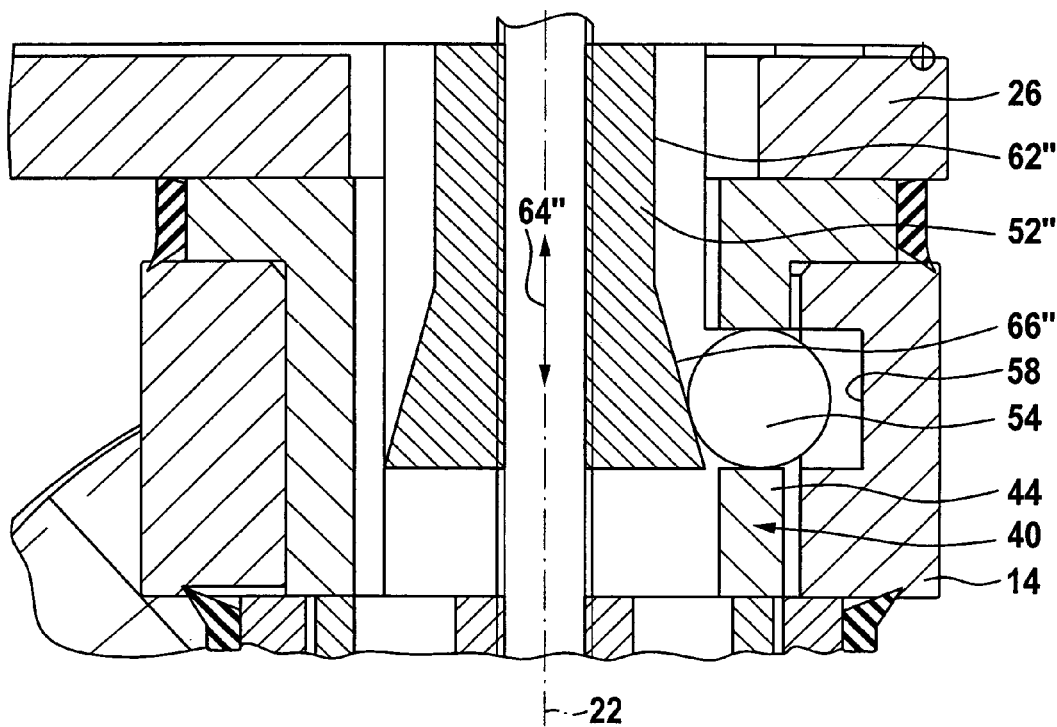
FIG. 26 shows a section similar to FIG. 4 through a third exemplary embodiment of a trailer coupling according to the invention.
Figure 27:
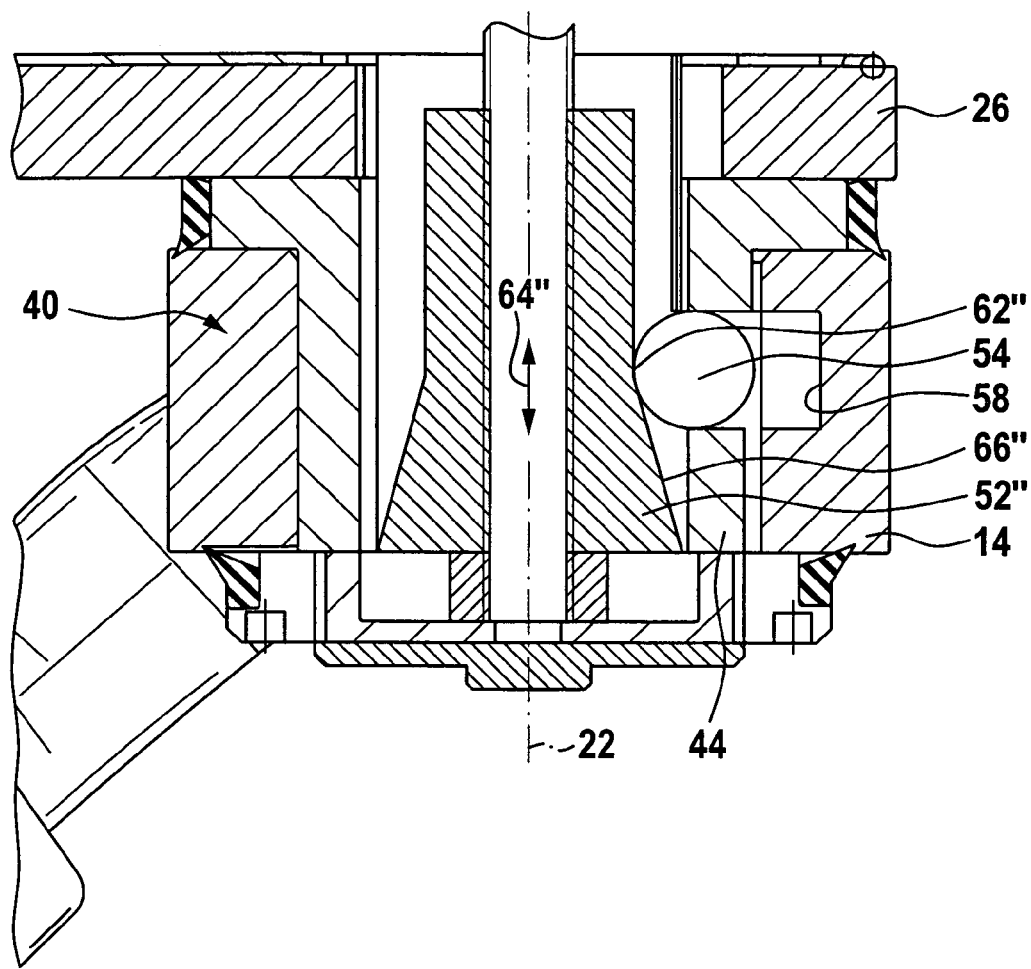
FIG. 27 shows a section similar to FIG. 6 through the third exemplary embodiment of the trailer coupling according to the invention.

In the case of a third exemplary embodiment of a trailer coupling according to the invention, represented in FIGS. 26 and 27, all those parts which are identical with those of the preceding exemplary embodiments are provided with the same reference signs, so that in respect of explanation of these, reference is made in full to the statements concerning the preceding exemplary embodiments.

In contrast to the first exemplary embodiment, in the case of the third exemplary embodiment, the actuating body 52" is not rotatable about the pivot axis 22, but is arranged to be displaceable in the guide body 40, preferably in the guide sleeve 44, in its direction of actuation 64", substantially parallel to the pivot axis 22.

For this reason, the retraction space 62" for each of the rotation-blocking bodies 54 is for example a cylindrical surface with respect to the pivot axis 22 and this is adjoined by a surface which widens conically in a radial direction with respect to the pivot axis 22 in order to form the pressure-exerting surface 66".

The pressure-exerting surfaces 66" are thus effective by displacing the actuating bodies 52" in the direction of the carrying plate 26 and press, in a manner analogous to the first exemplary embodiment, the rotation-blocking bodies 54 radially outwards and into the receiving spaces 58 or 60, so that locking of the pivot-bearing body 14 is effected in a manner corresponding to the same mechanism as in the case of the first exemplary embodiment.

In similar manner, it is achieved by displacement of the actuating body 52" in the direction of actuation 64 but away from the carrying plate 26, that the rotation-blocking bodies 54 interact with the retraction receiving space 62 and are no longer acted on by the pressure-exerting surfaces 66, so that the rotation-blocking bodies 54 are able to enter into the guide sleeve of the guide body 40 so far that they no longer project radially above this and thus no longer engage in the receiving space 58 or 60, so that the pivot-bearing body 14 is freely rotatable about the pivot axis 22.

In the case of the third exemplary embodiment, the displacement of the actuating body 52" in the direction of actuation 64" is effected by any kind of linear drive.

The invention claimed is:

1. Trailer coupling, comprising:
a ball neck which can be moved between an operating position and a rest position and has a pivot-bearing body disposed at a first end and a coupling ball disposed at a second end,
a vehicle-mounted pivot-bearing unit in which the pivot-bearing body is accommodated such that the pivot-bearing body can be pivoted about at least one pivot axis between the operating position and the rest position, and
a rotation-blocking device having at least two rotation-blocking bodies, each of which can be moved in a guide direction with at least one component in a radial direction in relation to the at least one pivot axis, each of the at least two rotation-blocking bodies adapted to be engaged with, and disengaged from, a corresponding receiving space by movement in the respective guide direction, the rotation-blocking device having an actuating body which has at least one wedge surface running transversely to the guide direction, which actuating body can be moved in an actuating direction and is a common actuating body for the at least two rotation-blocking bodies, the movement of the actuating body in the actuating direction can move, and force, the at least two rotation-blocking bodies in the respective guide direction.

2. Trailer coupling according to claim 1, wherein the rotation-blocking device comprises at least three rotation-blocking bodies.

3. Trailer coupling according to claim 2, wherein the rotation-blocking bodies are disposed relative to the actuating body such that at least reaction forces of the rotation blocking bodies which are directed transversely to the at least one pivot axis and act on the actuating body compensate one another at least in part.

4. Trailer coupling according to claim 2, wherein the rotation-blocking bodies are disposed relative to the actuating body such that at least reaction forces of the rotation-blocking bodies which are directed transversely to the at least one pivot axis and act on the actuating body substantially cancel one another.

5. Trailer coupling according to claim 1, wherein the at least two rotation-blocking bodies are disposed around the actuating body.

6. Trailer coupling according to claim 1, wherein the at least two rotation-blocking bodies are disposed substantially symmetrically in relation to a plane running perpendicularly to the at least one pivot axis.

7. Trailer coupling according to claim 1, wherein the at least two rotation-blocking bodies interact with the corresponding receiving spaces such that the pivot-bearing body is subjected to torques acting in opposite directions to one another.

8. Trailer coupling according to claim 1, wherein the at least two rotation-blocking bodies can be moved from a release position into a blocking position by the actuating body.

9. Trailer coupling according to claim 8, wherein the actuating body is formed such that, in an inactive position, the actuating body allows the release position of the at least two rotation-blocking bodies.

10. Trailer coupling according to claim 8, wherein the actuating body is formed such that, in an active position, the actuating body retains the at least two rotation-blocking bodies in a blocking position.

11. Trailer coupling according to claim 10, wherein the actuating body is forced in a direction of an active position by an elastic energy store.

12. Trailer coupling, comprising:
a ball neck which can be moved between an operating position and a rest position and has a pivot-bearing body disposed at a first end and a coupling ball disposed at a second end,
a vehicle-mounted pivot-bearing unit in which the pivot-bearing body is accommodated such that the pivot-bearing body can be pivoted about at least one pivot axis between the operating position and the rest position, and
a rotation-blocking device having at least one rotation-blocking body, which can be moved in a guide direction with at least one component in a radial direction in relation to the at least one pivot axis, the at least one rotation-blocking body adapted to be engaged with, and disengaged from, a corresponding receiving space by movement in the guide direction, the rotation blocking device having an actuating body which has a wedge surface running transversely to the guide direction, which actuating body can be moved in an actuating direction and the movement of the actuating body in the actuating direction can move, and force, the at least one rotation-blocking body in the guide direction, the actuating body having a direction of actuation extending in the direction of the at least one pivot axis.

13. Trailer coupling, comprising:
a ball neck which can be moved between an operating position and a rest position and has a pivot-bearing body disposed at a first end and a coupling ball disposed at a second end,
a vehicle-mounted pivot-bearing unit in which the pivot-bearing body is accommodated such that the pivot-bearing body can be pivoted about at least one pivot axis between the operating position and the rest position, and
a rotation-blocking device having at least one rotation-blocking body, which can be moved in a guide direction with at least one component in a radial direction in relation to the at least one pivot axis, the at least one rotation-blocking body adapted to be engaged with, and disengaged from, a corresponding receiving space by movement in the guide direction, the rotation-blocking device having an actuating body which has a wedge surface running transversely to the guide direction, which actuating body can be moved in an actuating direction and the movement of the actuating body in the actuating direction can move, and force, the at least one rotation-blocking body in the guide direction,
the actuating body being disposed such for rotation about the at least one pivot axis.

14. Trailer coupling according to claim 13, wherein the actuating body has wedge surfaces which extend over an angular region around the at least one pivot axis and vary in terms of radial spacing from the at least one pivot axis.

15. Trailer coupling, comprising:
a ball neck which can be moved between an operating position and a rest position and has a pivot-bearing body disposed at a first end and a coupling ball disposed at a second end,
a vehicle-mounted pivot-bearing unit in which the pivot-bearing body is accommodated such that the pivot-bearing body can be pivoted about at least one pivot axis between the operating position and the rest position, and
a rotation-blocking device having at least one rotation-blocking body, which can be moved in a guide direction with at least one component in the radial direction in relation to the at least one pivot axis, the at least one rotation-blocking body adapted to be engaged with, and disengaged from, a corresponding receiving space by movement in the guide direction, the rotation-blocking device having an actuating body which has a wedge surface running transversely to the guide direction, which actuating body can be moved in an actuating direction and the movement of the actuating body in the actuating direction can move, and force, the at least one rotation-blocking body in the guide direction,
the at least one rotation-blocking body being guided by a guide body which follows the pivot-bearing body in the radial direction.

16. Trailer coupling according to claim 15, wherein the guide body has a guide sleeve with a guiding accommodating region for the at least one rotation-blocking body.

17. Trailer coupling according to claim 15, wherein a bearing for the actuating body is connected to the guide body.

18. Trailer coupling according to claim 15, wherein the guide body forms a pivot bearing for the pivot-bearing body.

19. Trailer coupling according to claim 15, wherein the guide body is part of the vehicle-mounted pivot-bearing unit.

20. Trailer coupling according to claim 15, wherein the actuating body encloses the guide body and the pivot-bearing body is enclosed by the guide body.

21. Trailer coupling according to claim 15, wherein the actuating body is enclosed by the guide body, and the pivot-bearing body engages around the guide body.

22. Trailer couplings comprising:
a ball neck which can be moved between an operating position and a rest position and has a pivot-bearing body disposed at a first end and a coupling ball disposed at a second end,
a vehicle-mounted pivot-bearing unit in which the pivot-bearing body is accommodated such that the pivot-bearing body can be pivoted about at least one pivot axis between the operating position and the rest position, and
a rotation-blocking device having at least one rotation-blocking body, which can be moved in a guide direction with at least one component in a radial direction in relation to the at least one pivot axis, the at least one rotation-blocking body adapted to be engaged with, and disengaged from, a corresponding receiving space by movement in the guide direction, the rotation-blocking device having an actuating body which has a wedge surface running transversely to the guide direction, which actuating body can be moved in an actuating direction and the movement of the actuating body in the actuating direction can move, and force, the at least one rotation-blocking body in the guide direction,
the pivot-bearing body forming an outer body which encloses the pivot-bearing unit on the outside and is disposed in relation to the pivot-bearing unit such that the pivot bearing body cannot be displaced in the direction of the at least one pivot axis.

23. Trailer coupling according to claim 22, wherein the first end of the ball neck is attached to the outer body.

24. Trailer coupling according to claim 1, wherein the actuating body can be moved from an active position into an inactive position by an actuating arrangement.

25. Trailer coupling according to claim 24, wherein the actuating body can be moved, by the actuating arrangement, counter to a direction in which the actuating body is forced by an energy store.

26. Trailer coupling according to claim 24, wherein the actuating arrangement can be used to rotate the actuating body counter to a direction of rotation which is brought about by an energy store.

27. Trailer coupling according to claim 26, wherein the actuating arrangement is formed such that the actuating arrangement passes automatically into a starting position.

28. Trailer coupling according to claim 27, wherein the drive element of the actuating arrangement is forced in a direction of a starting position by an elastic energy store.

29. Trailer coupling according to claim 24, wherein the actuating arrangement has a drive element which is coupled to the actuating body.

30. Trailer coupling according to claim 29, wherein the drive element and the actuating body are coupled to one another via a carry-along coupling device.

31. Trailer coupling according to claim 30, wherein the carry-along coupling device has a free-travel state, in which there is no carry-along action, and a carry-along state.

32. Trailer coupling according to claim 31, wherein the carry-along coupling device is formed such that, starting from a starting position, movement of the drive element brings about movement of the actuating body in an intermediate position, only following passage through the free-travel state and once the carry-along state has been reached.

33. Trailer coupling according to claim 1, further comprising a safety device adapted for blocking the actuating body.

34. Trailer coupling according to claim 33, wherein the safety device is adapted to block the actuating body against reaching its inactive position.

35. Trailer coupling according to claim 24, wherein the actuating arrangement is coupled to a safety device.

36. Trailer coupling according to claim 35, wherein the safety device blocks any movement of the actuating body which is not initiated by actuation.

37. Trailer coupling according to claim 35, wherein when the actuating arrangement is not actuated, the safety device blocks movement of the actuating body into an inactive position.

38. Trailer coupling according to claim 35, wherein a drive element is coupled to the safety device.

39. Trailer coupling according to claim 38, wherein an action to which the actuating body is subjected and an action to which the safety device is subjected are co-ordinated with one another via the drive element.

40. Trailer coupling according to claim 39, wherein as the drive element moves from the starting position into an intermediate position, the drive element transfers the safety device from a securing position into a disengaged position.

41. Trailer coupling according to claim 38, wherein the drive element and the safety device are coupled to one another via a mechanical coupling device.

42. Trailer coupling according to claim 41, wherein the mechanical coupling device uses a guide track to control an action to which the safety device is subjected.

* * * * *

UNITED STATES PATENT AND TRADEMARK OFFICE
CERTIFICATE OF CORRECTION

PATENT NO. : 7,604,249 B2  Page 1 of 1
APPLICATION NO. : 11/483404
DATED : October 20, 2009
INVENTOR(S) : Gentner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Fifth Day of October, 2010

David J. Kappos
*Director of the United States Patent and Trademark Office*